(12) United States Patent
Antrim et al.

(10) Patent No.: US 8,744,436 B2
(45) Date of Patent: Jun. 3, 2014

(54) ROAMING SELECTION SERVICES

(75) Inventors: Todd W. Antrim, Newnan, GA (US);
Max G. Faulkner, Roswell, GA (US);
Mark Enzmann, Roswell, GA (US);
James Hudgens, Roswell, GA (US)

(73) Assignee: AT&T Mobility II LLC, Atlanta, GA (US)

( * ) Notice: Subject to any disclaimer, the term of this patent is extended or adjusted under 35 U.S.C. 154(b) by 950 days.

(21) Appl. No.: 12/159,578

(22) PCT Filed: Jul. 16, 2007

(86) PCT No.: PCT/US2007/073613
§ 371 (c)(1),
(2), (4) Date: Aug. 2, 2010

(87) PCT Pub. No.: WO2008/027660
PCT Pub. Date: Mar. 6, 2008

(65) Prior Publication Data
US 2010/0291924 A1   Nov. 18, 2010

Related U.S. Application Data

(60) Provisional application No. 60/824,412, filed on Sep. 1, 2006.

(51) Int. Cl.
*H04W 4/00* (2009.01)
(52) U.S. Cl.
USPC ............... 455/433; 455/432.1; 455/435.2
(58) Field of Classification Search
USPC .................. 455/433, 432.1, 435.2
See application file for complete search history.

(56) References Cited

U.S. PATENT DOCUMENTS

| | | | |
|---|---|---|---|
| 7,072,651 | B2 | 7/2006 | Jiang et al. |
| 2004/0087305 | A1* | 5/2004 | Jiang et al. .............. 455/432.1 |
| 2006/0135160 | A1 | 6/2006 | Jiang |
| 2006/0211420 | A1* | 9/2006 | Ophir et al. .............. 455/432.1 |
| 2006/0246897 | A1 | 11/2006 | Jiang |
| 2006/0246898 | A1 | 11/2006 | Jiang |
| 2006/0252423 | A1 | 11/2006 | Jiang |
| 2006/0286978 | A1 | 12/2006 | Jiang |
| 2007/0049269 | A1* | 3/2007 | Ophir et al. .............. 455/432.1 |
| 2007/0173252 | A1 | 7/2007 | Jiang |

FOREIGN PATENT DOCUMENTS

EP   1463366 A   9/2004

(Continued)

*Primary Examiner* — Jinsong Hu
*Assistant Examiner* — Jean Chang
(74) *Attorney, Agent, or Firm* — Parks IP Law LLC; Mickki D. Murray, Esq.

(57) ABSTRACT

Management of native subscriber registrations on a foreign network is accomplished via an approach that advantageously offers dynamic roaming, that is, the capability to send data over-the-air to populate a customer subscriber identity module (SIM) card with specific networks, in a specific order of preference, according to the characteristics and capabilities of the subscriber mobile station, the subscriber's home network, the foreign territory roamed, and the like. The approach also provides an SS7 service-based solution including the capability of the home network to control the roaming mobile station from registering on a non-preferred visited network, based on configurable rules. The approach provides the ability to segment subscribers, increased/assured quality of service, no limits on designation of carrier preferences, the ability to apportion roaming traffic across numerous operators in a given foreign territory, capability for real-time changes of preferred network, and preservation of manual network selection capabilities.

20 Claims, 15 Drawing Sheets

(56) References Cited

FOREIGN PATENT DOCUMENTS

| EP | 1653764 A | 5/2006 |
|---|---|---|
| WO | WO 02/104062 A | 12/2002 |
| WO | WO 2004/014101 | 12/2004 |
| WO | WO 2006/055629 | 5/2006 |
| WO | WO 2006/094024 | 9/2006 |
| WO | WO 2006/099388 | 9/2006 |
| WO | WO 2006/099389 | 9/2006 |
| WO | WO 2006/099476 | 9/2006 |

* cited by examiner

ROAMING SELECTION SERVICES

CROSS-REFERENCE TO RELATED APPLICATIONS

This application claims the benefit of U.S. Provisional Patent Application Ser. No. 60/824,412 entitled "ROAMER NETWORK SELECTION AND DIRECTION SERVICE" and filed Sep. 1, 2006, the entirety of which is incorporated by reference herein.

TECHNICAL FIELD

This invention relates generally to telecommunications, and particularly to systems and methods directing the selection of a preferred network by a roaming mobile station according to various operating parameters.

BACKGROUND

It is typical for the customers (or subscribers) of a wireless service provider (carrier), hereinafter also referred to as the carrier's native subscribers, to roam outside of the territory served by that carrier (the home network), and onto foreign networks serviced by other wireless service providers. By definition, a foreign network may be in another country, requiring international roaming, or can simply be a network serviced by another carrier in the same country.

The home carrier negotiates agreements with various other carriers by which the home carrier compensates the foreign carrier via a tariff for accommodating its customers on the foreign networks. It is common for the terms of these roaming agreements to vary somewhat, such that inevitably, certain agreements are more favorable to the home carrier than others. According to some roaming protocols, subscribers that roam can register on the network that has the strongest signal. This may not be the carrier with the best roaming rates or the carrier that best supports enhanced services to support data products. Thus, the home carrier has an incentive to encourage use of certain of the foreign networks that are available to its roaming subscribers.

One approach to directing foreign network selection involves downloading a list of preferred networks in a particular region to the subscriber's mobile station, use of the list typically being facilitated by the subscriber identity module (SIM). However, if a preferred network is not available when the subscriber attempts to register in the region, the typical protocol may lead to selection and continued use of a non-preferred network until the subscriber leaves that region. To address this problem, another approach redirects, via instructions communicated over-the-air (OTA) or via short message service (SMS), for example, a roaming mobile station that has registered with a non-preferred or less optimal network by instructing the mobile station to switch to a preferred or optimal network.

An alternative approach serially rejects a registration attempt directed to non-preferred or less optimal networks until a preferred or more optimal network is found, until the list of available networks has been exhausted without finding a preferred network, or the registration process is rejected altogether. However, both of these approaches must first detect whether a native subscriber is roaming on a foreign network, which is accomplished by utilizing a high impedance probe to monitor a link between the networks to detect various location update and other signaling messages exchanged between the foreign network and the home network's subscriber database. As an external device introduced into the system to monitor all signaling messages in order to detect roamers, the reliability of such solutions is dependent upon the likelihood of probe failure and capacity limitations.

Furthermore, to avoid creating a negative user experience, the home carrier is wise to enforce its preferences without inconveniencing the subscriber that is roaming outside of the home network. The user experience is severely compromised by serial rejection of registration attempts, which will cause a significant delay in call setup time, and which may be followed by refusal of service if the attempt is finally rejected according to the redirection protocol.

SUMMARY

The following presents a simplified summary in order to provide a basic understanding of some aspects of the disclosed architecture. This summary is not an extensive overview, and it is not intended to identify key/critical elements or to delineate the scope thereof. Its sole purpose is to present some concepts in a simplified form as a prelude to the more detailed description that is presented later.

The systems and methods of the present invention overcome the shortcomings of the prior art by managing native subscriber registrations on a foreign network. In one implementation, a hybrid approach advantageously offers dynamic roaming, that is, the capability to send data over-the-air (OTA) to populate the customer's subscriber identity module (SIM) card (e.g., public land mobile network (PLMN) slots 28-32) with specific networks, in a specific order of preference, according to the characteristics and capabilities of the subscriber, the subscriber's home network, the foreign territory roamed, and the like. The hybrid approach also provides an SS7 (signaling system seven) service-based solution including the capability of the home network to restrict the roaming mobile station from registering on a non-preferred visited network, based on configurable rules.

The many benefits of this hybrid approach include the ability to segment subscribers, increased/assured quality of service, no limits on designation of carrier preferences, the ability to apportion roaming traffic across numerous operators in a given foreign territory, capability for real time changes of preferred network, and preservation of manual network selection capabilities. The systems and methods of the invention are applicable in any suitable environment, and with any compatible subscriber class, including postpaid, prepaid, and resellers.

According to a first aspect of the invention, after a native subscriber registers on the foreign network, a carrier roaming list is communicated to the subscriber's SIM, which allows the home carrier to manage which carrier(s) the customer uses while in a specific foreign territory (domestic or international) based on the relative desirability of roaming relationships. The list may be tailored to the subscriber's profile such that various parameters, such as home country, account type, data capabilities, and the like, determine which carriers are preferred for that subscriber.

According to another aspect of the invention, the carrier roaming list sent to various subscribers from their home network can be used to apportion the roaming traffic to certain preferred networks based on additional parameters, including profitability, coverage, and service segmentation.

Advantageously, and in accordance with another aspect of the invention, at prescribed intervals after the roaming native subscriber has registered on a foreign network, the carrier roaming list is consulted to determine whether another carrier should be utilized. The carrier roaming list may be refreshed or updated at regular intervals, or upon receipt in the network of subsequent location update requests.

In one embodiment, the fields of a Preference Plan can include: Country or Location, Network Name, VLR (visitor location register) Address, Preference Priority, and Reject Error Code. A steered destination is defined, for example, either by country or location. The Preference Priority on steered VPLMNs (visited public land mobile network) can be defined by ranking order such as VPLMN-A=#1, VPLMN-B=#2, and VPLMN-C=#3, for example, although it is contemplated to provide the capability for configuring an equal preference for indifferent network selection of several foreign networks in the same territory. Furthermore, the Preference Priority can be defined by a distribution ratio such as VPLMN-A: X %, VPLMN-B: Y %, and VPLMN-C: Z %, with X %+Y %+Z %=100% on any steered destinations with three VPLMNs.

According to yet another aspect of the invention, the hybrid approach can be used to prevent roaming by customers that are still within range of the home network, but are in a bordering country, and thus, would be considered to be roaming internationally Similarly, certain subscribers may be prevented from being redirected (or "blacklisted"). Certain embodiments include a GUI-based interface for blacklisting subscribers, such as by international mobile subscriber identity (IMSI) or IMSI range.

To the accomplishment of the foregoing and related ends, certain illustrative aspects of the disclosed architecture are described herein in connection with the following description and the annexed drawings. These aspects are indicative, however, of but a few of the various ways in which the principles disclosed herein can be employed and is intended to include all such aspects and their equivalents. Other advantages and novel features will become apparent from the following detailed description when considered in conjunction with the drawings.

DETAILED DESCRIPTION

Figure 1:
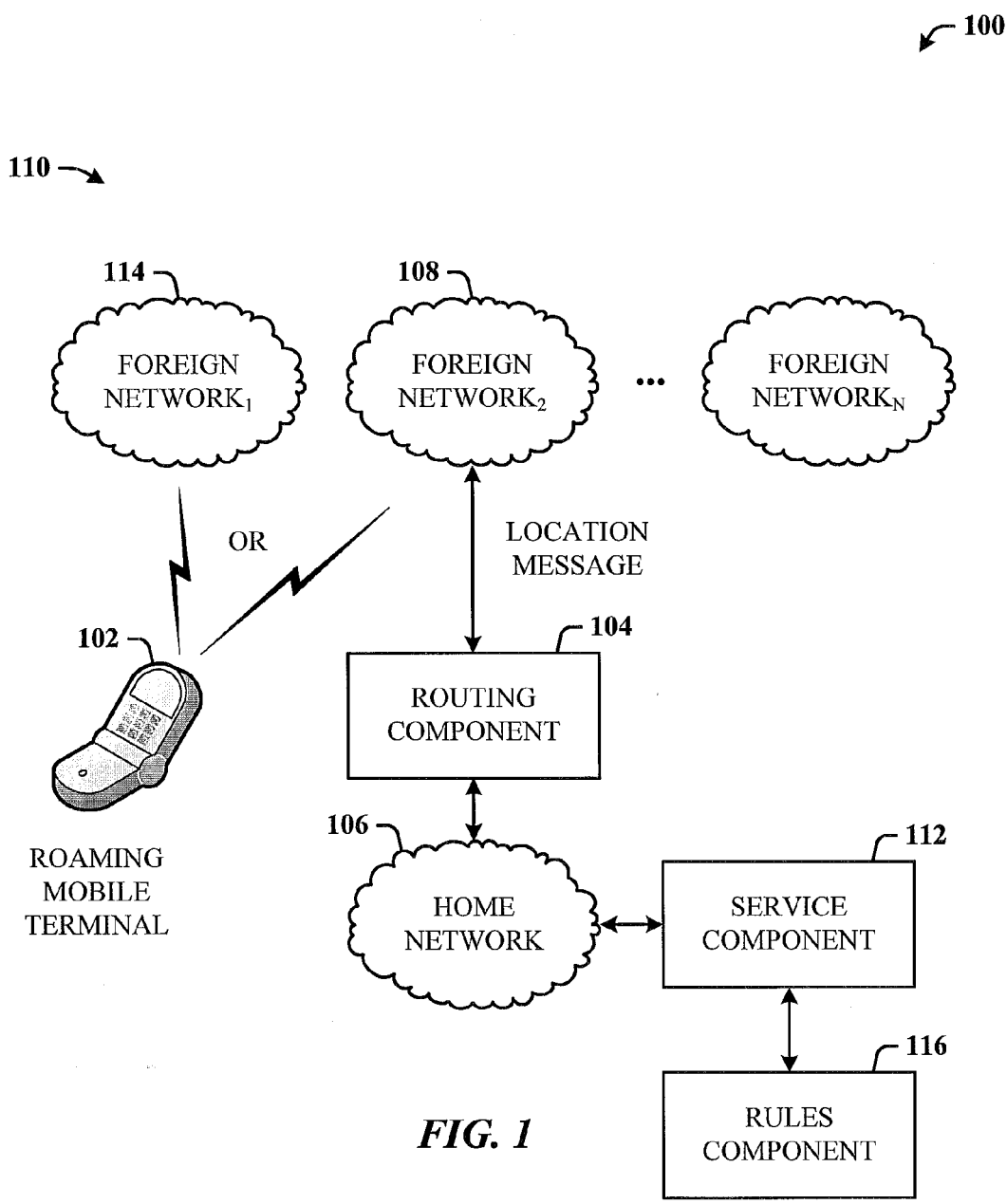
FIG. 1 illustrates certain elements of a cellular communications system that provides dynamic management of a roaming mobile terminal

As required, detailed novel embodiments are disclosed herein. It must be understood that the disclosed embodiments are merely exemplary and may be embodied in various and alternative forms, and combinations thereof. As used herein, the word "exemplary" is used expansively to refer to embodiments that serve as an illustration, specimen, model or pattern. The figures are not necessarily to scale and some features may be exaggerated or minimized to show details of particular components. In other instances, well-known components, systems, materials or methods have not been described in detail in order to avoid obscuring the invention. Therefore, specific structural and functional details disclosed herein are not to be interpreted as limiting, but merely as a basis for the claims and as a representative basis for teaching one skilled in the art to variously employ the invention.

Although applicable to any existing or yet to be developed wireless telecommunications network, the aspects of the invention will be described with reference to the global system for mobile communications (GSM) air interface that uses general packet radio service (GPRS) as an enabling bearer. Examples of other suitable wireless and radio frequency data transmission systems include networks utilizing code division multiple access (CDMA), time division multiple access (TDMA), frequency division multiple access (FDMA), wideband code division multiple access (WCDMA), orthogonal frequency division multiplexing (OFDM), wireless fidelity (Wi-Fi), and various other 2.5 and 3G (third generation) and above wireless communications systems. Examples of other suitable enabling bearers include universal mobile telecommunications system (UMTS), enhanced data rates for global evolution (EDGE), high speed downlink/uplink packet access (HSDPA/HSUPA), voice over Internet protocol (VoIP), and similar communications protocols.

Reference is now made to the drawings, wherein like reference numerals are used to refer to like elements throughout.

FIG. 1 illustrates a cellular communications system 100 that provides dynamic management of a roaming mobile terminal 102. The system 100 includes a routing component 104 of a home network 106 for intercepting a location message (e.g., a GSM update location message) from a foreign network 108 of potentially a plurality of foreign networks 110 (denoted FOREIGN NETWORK$_1$ . . . FOREIGN NETWORK$_N$, where N is a positive integer). As previously indicated, a foreign network may be in another country, requiring international roaming, or can simply be a network serviced by another carrier in the same country. The location message is associated with the roaming mobile terminal 102 seeking access to the foreign network 108 while in the roaming mode. A service component 112 of the home network 106 processes the location message and dynamically manages the roaming mobile terminal 102 to register to the foreign network 108 or to register to a different foreign network 114.

The benefits of this approach include the ability to segment (or partition) subscribers while roaming by selectively managing (e.g., directing) subscriber access to the various foreign networks. This capability has a further benefit of providing improved (and potentially, assured) quality-of-service (QoS). The solution has no limit on the designation of carrier preferences. This approach also provides the capability to apportion roaming traffic across numerous foreign operators in a given foreign territory, for realtime changes of the preferred network, and preservation of manual network selection capabilities. Moreover, the disclosed architecture is applicable in any suitable environment, and with any compatible subscriber class, including postpaid, prepaid, and resellers.

The architecture also provides the ability to prevent roaming by customers that are still within range of the home network, but are in a bordering country, and thus, would be considered to be roaming internationally. Similarly, based on rules executed during the registration and/or roaming processes by a rules component 116 (also referred to as a rules selection component) certain subscribers may be prevented from being redirected (or "blacklisted") according to configurable rules.

Figure 2:
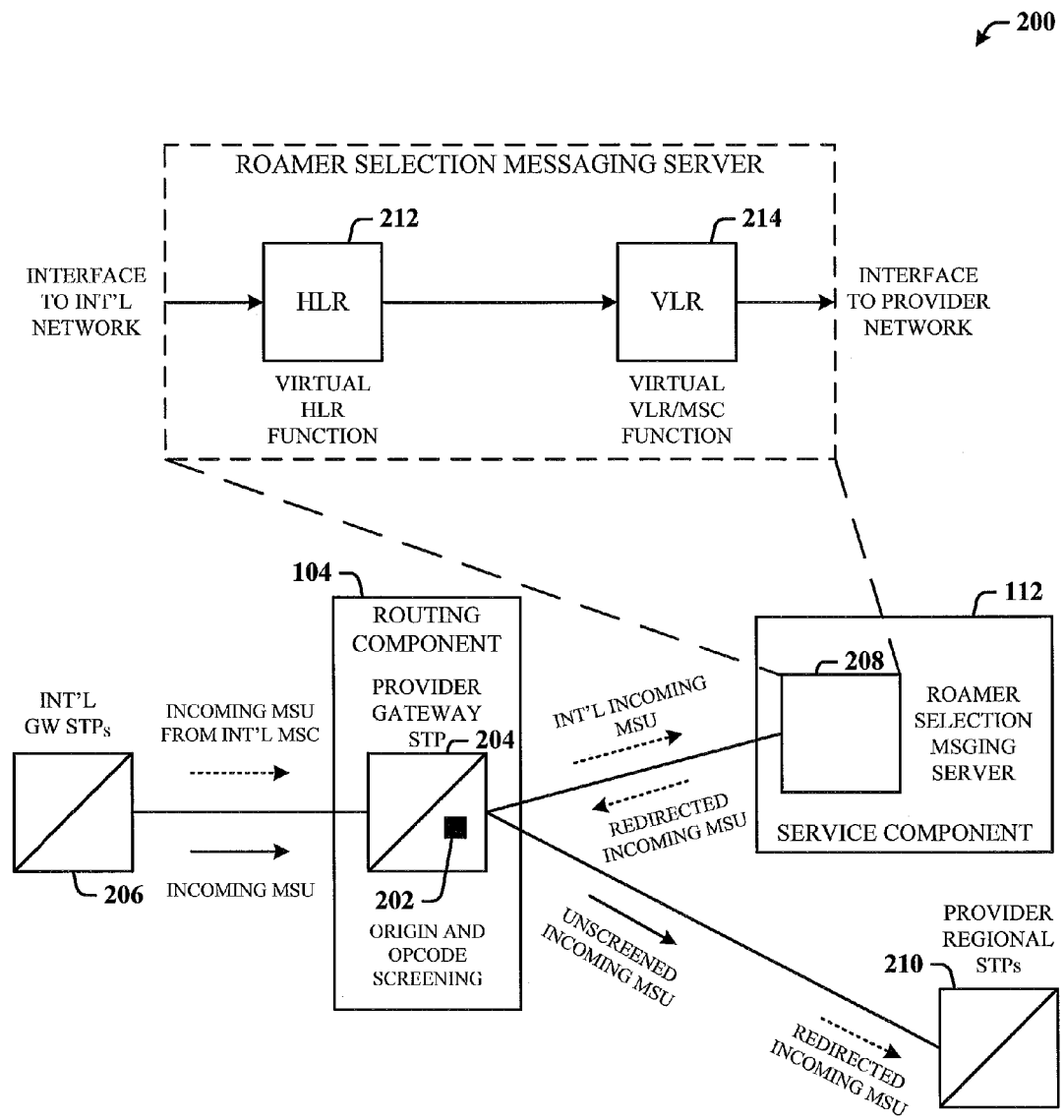
FIG. 2 illustrates an exemplary core system for dynamic roaming management in accordance with the disclosed architecture.

FIG. 2 illustrates an exemplary core system 200 for dynamic roaming management in accordance with the disclosed architecture. The system 200 activates a messaging application 202 (e.g., GSM MAP) (represented as or in the routing component 104) of one or more home network gateway signal transfer points (STPs) (represented collectively as STP 204). The STPs 204 receive incoming mobile subscriber unit (MSU) signals from international (or foreign) network gateway (GW) STPs 206, and reroute the location messages (e.g., GSM location update messages) to remote roamer servers 208 (herein referred to as roamer selection (messaging) servers or systems, and represented as or in the service component 112). The remote servers 208 are configured to analyze the location messages (e.g., location update messages) and if necessary, respond with a rejection class of service (COS) code to a visiting location register (VLR) to make the mobile terminal re-scan and search for another foreign carrier.

The remote servers 208 exchange signaling messages (e.g., GSM MAP) with the home network's home location register (HLR) for international roamers. In other words, the international location messages are re-routed to the roamer servers 208.

The remote roamer servers 208 can be deployed at STP locations to mitigate latency issues. The home gateway STPs 204 forward the location messages to the servers 208, which servers 208 will analyze and then pass location messages to the HLRs. In one implementation, the ability to interrogate additional messages at the servers 208 can be provided without incurring additional capital expense. Incoming MSU signals that are not internationally-originated are forwarded unscreened by the home network STPs 204 directly to the regional provider STPs 210.

The remote roamer server(s) 208 provides functionality in the form of a virtual HLR 212 and a virtual VLR (visitor location register)/MSC (mobile switching center) 214. Thus, from the perspective of the international network, the server(s) 208 function as an HLR and a VLR. Similarly, the home network perceives the output of the server(s) 208 as having functionality associated with a VLR/MSC.

Each remote server 208 can be assigned a valid point code, E.164 address, and CLLI (common language location identifier) code. In one implementation, the server 208 will connect to the appropriate STP 204 and signal using IGT (intermediate global title) to alias the point code of the adjacent STP.

Figure 3:
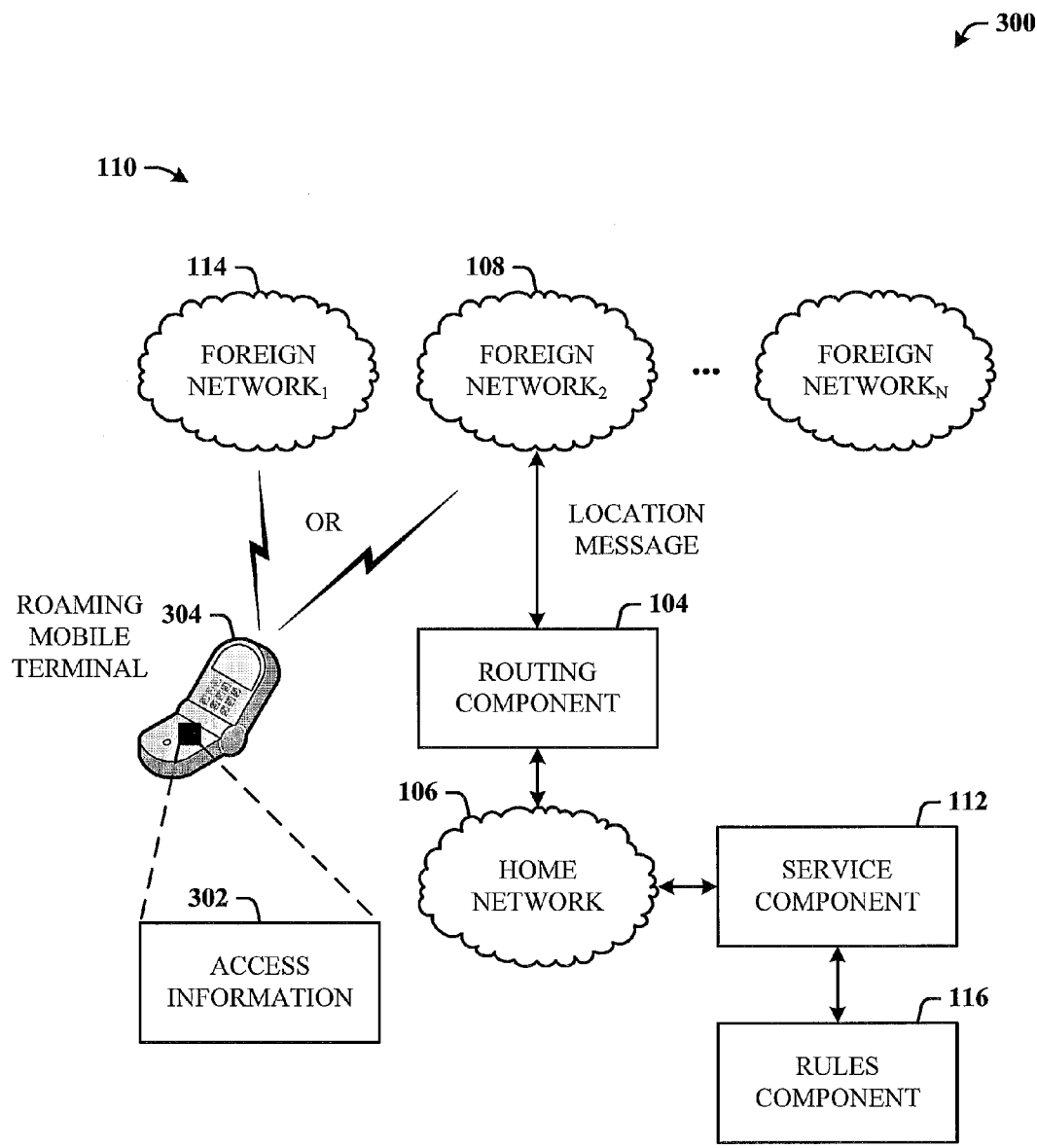
FIG. 3 illustrates an alternative embodiment that employs a hybrid approach that includes management by the home network based on dynamic changes to an access list downloaded to the roaming terminal.

FIG. 3 illustrates an alternative embodiment that employs a hybrid approach that includes management by the home network based on dynamic changes to an access list downloaded to the roaming terminal. The system 300 includes the elements and components of the system 100 of FIG. 1, but further provides the function of downloading modifiable access information 302 (e.g., a provider access list) to a mobile terminal 304. Dynamic management is then performed according to the access information of the terminal 304.

In operation, after a native subscriber registers on the foreign network, the access information (e.g., a carrier roaming list) is communicated to a subscriber identity module (SIM) or universal SIM (USIM) in the subscriber's terminal 304, which allows the home network (or carrier) to manage which foreign networks (or carrier(s)) the subscriber uses while in a specific foreign territory (domestic or international) based on the relative desirability of roaming relationships. The access information 302 can be tailored to the subscriber's profile, as stored in the home network, where various parameters such as home country, account type, data capabilities, and the like, determine which carriers are preferred for that subscriber, and hence, will be added to the access information 302 for download and execution for the roaming process.

The capability to dynamically manage roamer access in foreign networks via the downloadable access information sent to various subscribers from the home network provides the ability to apportion the roaming traffic to certain preferred networks based on additional parameters, including profitability, coverage, and service segmentation. Moreover, at prescribed intervals after the roaming subscriber has registered on a foreign network, the access information 302 is consulted to determine whether another carrier should be utilized. The access information 302 can be refreshed or updated at regular intervals and/or upon receipt in the home network of subsequent location messages.

In one embodiment, a subscriber preference plan can include fields related to country or location, network name, VLR address, preference priority, and reject error code, for example. A steered destination can be defined, for example, by country or location. The preference priority on steered visited public land mobile networks (VPLMNs) can be defined by a ranking order such as VPLMN-A=#1, VPLMN-B=#2, and VPLMN-C=#3, for example, although it is contemplated to provide the capability for configuring an equal preference for indifferent network selection of several foreign networks in the same territory. Furthermore, the preference priority can be defined by a distribution ratio such as VPLMN-A: X %, VPLMN-B: Y %, and VPLMN-C: Z %, with X %+Y %+Z %=100% on any steered destinations with three VPLMNs. Examples of this are described below.

Figure 4:
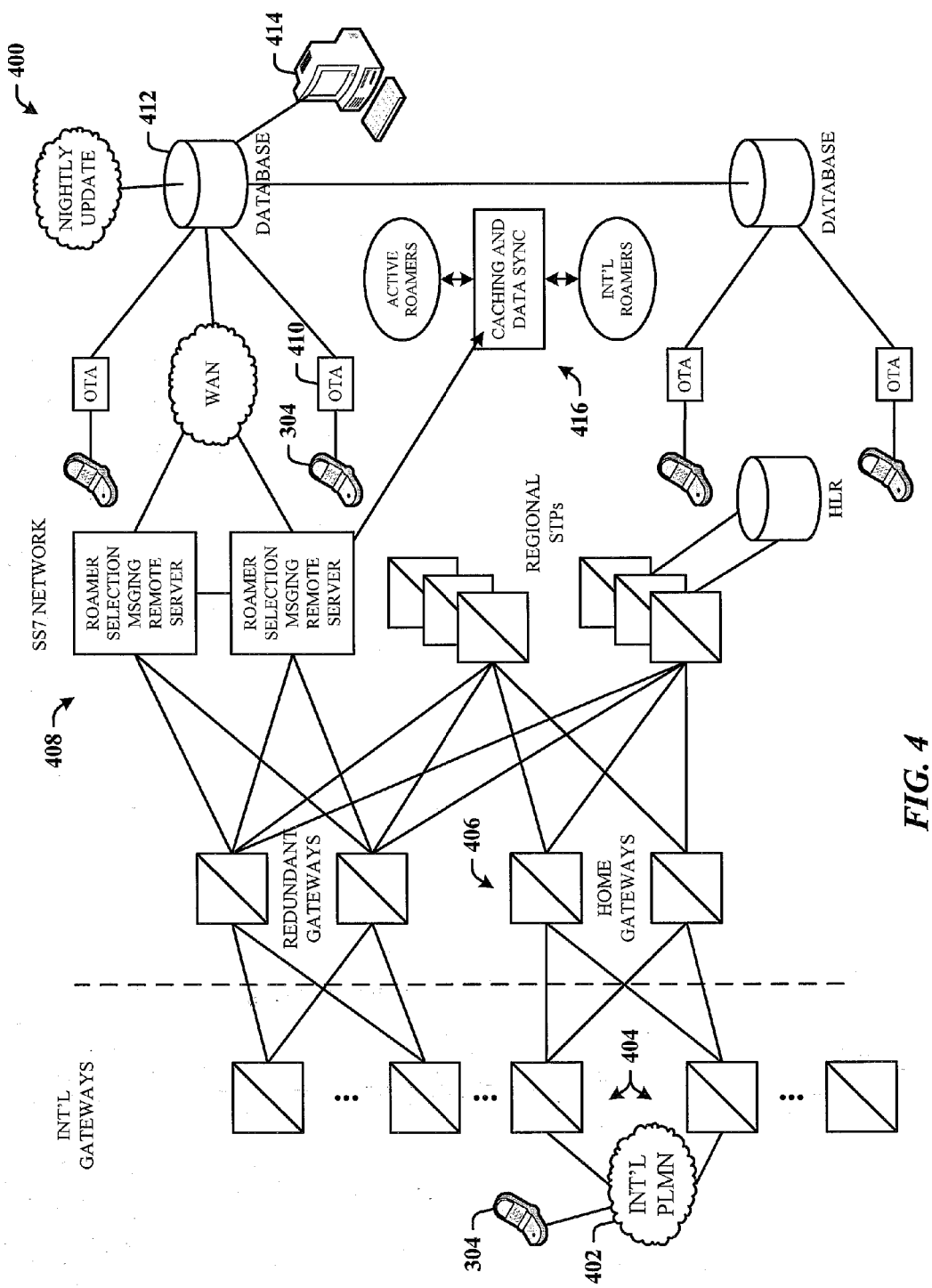
FIG. 4 illustrates a more detailed exemplary cellular communications system for management of roamer terminals.

FIG. 4 illustrates a more detailed exemplary cellular communications system 400 for management of roamer terminals. The subscriber terminal 304 registers to an international network 402. A location message from the terminal 304 is forwarded by the international VLR (not shown) of the international network 402 to one or more international gateways 404, and then to home network STPs 406. A GSM MAP application can be activated on international gateway STPs 404 to provide opcode filtering and forwarding.

Location (and other selected) messages can be sent for analysis by co-located roamer servers 408. If the international carrier is approved by a roamer server 408, the location message is forwarded to the home network HLR (not shown) for registration authorization. In one implementation, the first attempt at registration on the foreign network is automatically allowed. This can be made configurable, as desired.

Information related to an international PLMN (or foreign carrier network) appropriate for the visited country and subscriber's technical capabilities, as defined by the subscriber profile, is then sent via a messaging service (e.g., SMS-short message service) OTA via OTA systems 410 to the mobile terminal 304 and written to the terminal SIM/USIM. In one implementation, the subscriber has to wait for the PLMN information to be installed before a call can be placed on the foreign network. In an alternative implementation, however, the PLMN information does not have to be delivered before the subscriber is authorized to make calls. The PLMN information is intended to enhance the customer's selection experience upon subsequent registrations.

If the roamer server 408 determines that the carrier is not authorized, or the subscriber is not to be registered to the network for minutes-of-use (MOU) load balance reasons, a reject message is sent by the roamer server 408 and then to the foreign network VLR (not shown). The terminal 304 then rescans using the international PLMN list in the SIM card, and the process is repeated. The roamer selection process will be repeated each time a subscriber attempts registration within the current or new visited country. This is because the access information in the terminal 304 can be changed dynamically from the home network.

The home network submits a nightly batch file update containing subscriber's account and attributes information to a database system 412. The roamer servers 408 will create, and optionally, retain roaming profiles based on the subscriber's account type and attributes. Images of the remote roamer servers 408 can be stored daily, for example. These images and associated updates can be pushed to the remote servers nightly or the roamer servers 408 can pull the updates based on a demand profile as the updates are received.

Following is a description of OTA delivery parameters for all OTA system 410 downloads. The roamer selection system 408 performs OTA downloads for all roamer selection PLMN updates. These PLMN updates do not interfere with domestic PLMN and international PLMN updates. The selection system 408 sends all OTA downloads through a suitable OTA delivery platform (e.g., system 410). Successful proof-of-receipt (PoR) can be implemented as a requirement for all roamer selection downloads. Selection can use PLMN slots 28 through 32 to deliver the PLMN settings. These slots may be the same as for a current international roaming solution using the roaming platform. For 3G subscribers, a 3G PLMN selector file can be downloaded with an equivalent download.

Roamer selection re-sequences MNC (mobile network code) and MCC (mobile country code) settings for the PLMN based on proximity to the apportioning goals for a location. In general, each MNC and MCC for a carrier can be updated in the PLMN list (the access information 302) based on relative apportioning order, which means that the first carrier that will improve the overall apportioning goals goes first.

In a situation where carriers A, B, and C have an apportioning distribution of 50%, 30%, and 20%, for example, but have an actual steered distribution of 55%, 35%, and 10%, a proximity algorithm can place carrier C first in the list (the access information), since carrier C is 10% from its goal while carriers A and B are only 5% from their respective goals. The PLMN download for a subscriber apportioned based on the example above would have a PLMN download with carrier C first, followed by carriers A and B.

Given equal apportioning distribution, the proximity algorithm attempts to distribute based on relative preference and will place carrier A before carrier B since this is the defined distribution.

The roamer selection re-sequencing algorithm for PLMN steering based on goal proximity resembles a minimax fit algorithm. The variation used herein can be based on the combination of goal percentage and an ideal set of winners based on percentage won, although this variation can also include a rule to disallow adjustment to prevent the proximity algorithm from becoming too greedy.

PLMN delivery for the dislcosed selection system can be achieved when the roaming platform international dynamic roaming features are disabled, since these features may conflict with PLMN delivery. In the event that the subscriber requires a new download as a result of changing location prior to PLMN download delivery, the selection system sends another PLMN download to ensure the subscriber has the correct PLMN for the new location.

The subscriber PLMN settings can be valid for the time of registration, segment, balance method, and location. The selection system will update the cache information for the subscriber IMSI indicating that a download was submitted. On receipt of the download by the subscriber's handset and successful PoR, the selection system will update the cache information to indicate that a download was received successfully.

The following primary usage scenario applies to OTA downloads sent by the roamer selection system 408. The selection system determines whether a PLMN download is necessary by comparing the download that the selection system would send with the PLMN download the subscriber has already. If the subscriber does not have a selection system download or the subscriber's PLMN settings differ, the selection system submits a PLMN download to the subscriber's SIM or USIM card. The selection system can use slots 28 through 32 inclusive for the selection system PLMN download. If the subscriber is a 3G subscriber (e.g., UMTS), an additional download can be submitted for the operator-controlled PLMN selector with SIM file, generated in the same manner as for the 2G PLMN selector. If the subscriber already had a pending PLMN download prior to sending a new PLMN download, the selection system no longer tracks the previous PLMN download and begins to track the new PLMN download. For selection system purposes the previous PLMN download is now out-of-date and should not be tracked.

The selection system updates the cache information for the IMSI (international mobile subscriber identity) to indicate the pending download status and content of the download. This optimizes instances where multiple country zones result in the same download for a specific subscriber segment. As previously indicated, the selection system can format a PLMN download for the subscriber based on proximity to each apportioning goal. The selection system proximity algorithm consists of the non-greedy minimax fit algorithm based on apportioning goal proximity and defined apportioning order.

The proximity algorithm can include any of the following rules (for execution by the rules component 116 of FIG. 1) which adjust subscriber apportioning:

1. Calculate the proximity to the apportioning goal as an absolute value. For instance, if the apportioning for carrier A is 8% over goal and the apportioning for carrier B is 7% under goal, treat these values as 8% and 7%, respectively.
2. Collate the carrier list based on largest distance from the goal first and apportioning order first. For instance, if carriers A, B, and C have apportioning goals of 50%, 30%, and 20% and have actual apportioning of 55%, 35%, and 10%, the carrier list collates to C, A, and B since C is the greatest distance from the apportioning goal, but A and B are equidistant from the goal and collate based on a defined apportioning order.

3. Determine if the calculated PLMN collation differs sufficiently enough from any previous PLMN collation to warrant sending a PLMN update. In general, if the subscriber has already been balanced recently, do not rebalance the subscriber unless a specific carrier is considerably distant from the apportioning goals. This algorithmic rule avoids inducing hysteresis in the OTA platform (e.g., platform 410) and both additional PLMN delivery load and expense.

4. (Optional) Adjust the collation order based on whether the point-in-time collation meets other goals such as spot market apportioning. In this case, PLMN collation adjusts slightly in advance of spot market apportioning to steer subscribers in advance of the spot market time period. This adaptive behavior may be developed later as an enhancement based on the home carrier's guidance.

The selection system can ignore PoR delivery reports for any PLMN downloads not tracked by the selection system. This may occur for PLMN downloads which were previously tracked using OTA subscription notifications but are no longer tracked by the selection system, although in general, the selection system cancels the subscription notification for each download which is no longer valid. The selection system matches PoR delivery reports to the appropriate subscriber IMSI for PLMN downloads tracked by the selection system, and writes historical information for the PLMN download submit and PoR delivery status.

A graphical user interface (GUI) system 414 for roamer operations profile management and customer care can be provided for history lookups and other desired functions. Roamer selection configuration and operations systems include the administrative GUI for the selection central servers 408 which allows customer service representatives and technical staff to adjust roamer selection parameters for specific subscribers as needed, groups of subscribers with a common segment identifier, or zone and country locations. The administrative GUI provides facilities for update with permission lists to limit access to sensitive parameters, allowing technical support staff more extensive access.

An administrative GUI access control list (ACL) supports varying levels of permissions granted to customer care and provider entities. The administrative GUI allows technical support and operations staff to manage and configure the selection servers by country, zone, E.164 identifier, and carrier, for example. The administrative GUI allows for table management as well as both blacklist rule and balance rule management. This includes the ability to add, reorder, delete, edit, and view rules. Roamer selection systems can require ongoing maintenance of blacklist rules, balance rules, and subscribers to ensure the the selection service remains effective for provider business needs and subscriber service experience. The GUI application allows customer care employees to investigate historical data associated with a subscriber's international roaming activity.

The system 400 can also include a caching and data synchronization system 416 for caching data associated with active roamers and international roamers.

Figure 5:
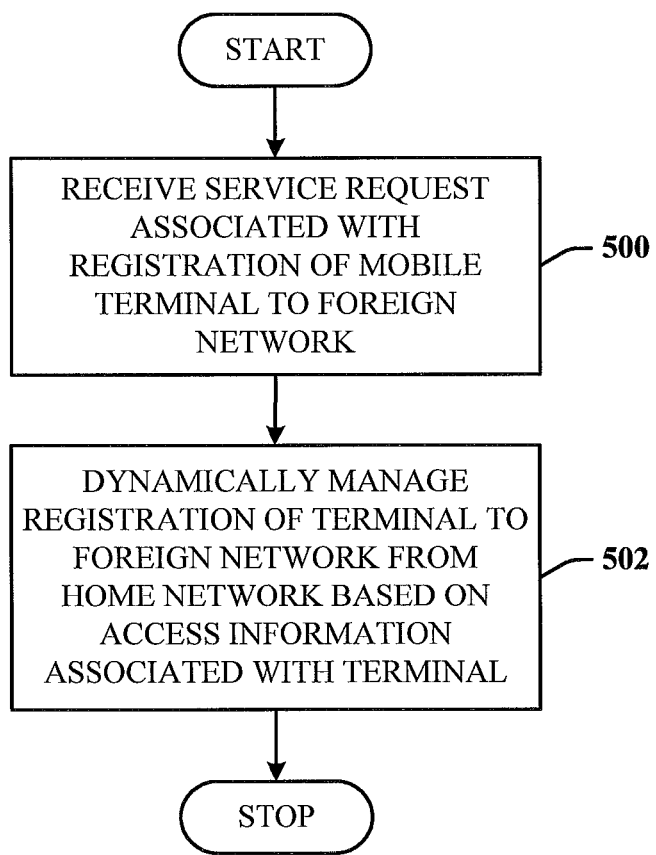
FIG. 5 illustrates a computer-implemented method of dynamically managing customer access to cellular services.

FIG. 5 illustrates a computer-implemented method of dynamically managing customer access to cellular services. While, for purposes of simplicity of explanation, the one or more methodologies shown herein, for example, in the form of a flow chart or flow diagram, are shown and described as a series of acts, it is to be understood and appreciated that the subject innovation is not limited by the order of acts, as some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the innovation.

At 500, a service request associated with registration of a mobile terminal to a foreign network is received. The request will be received at a home network via the foreign network. At 502, registration of the mobile terminal to the foreign network is dynamically managed from the home network, based on access information associated with the mobile terminal. This includes managing initial and subsequent registrations by adjusting the access information in the roaming terminal.

Figure 6:
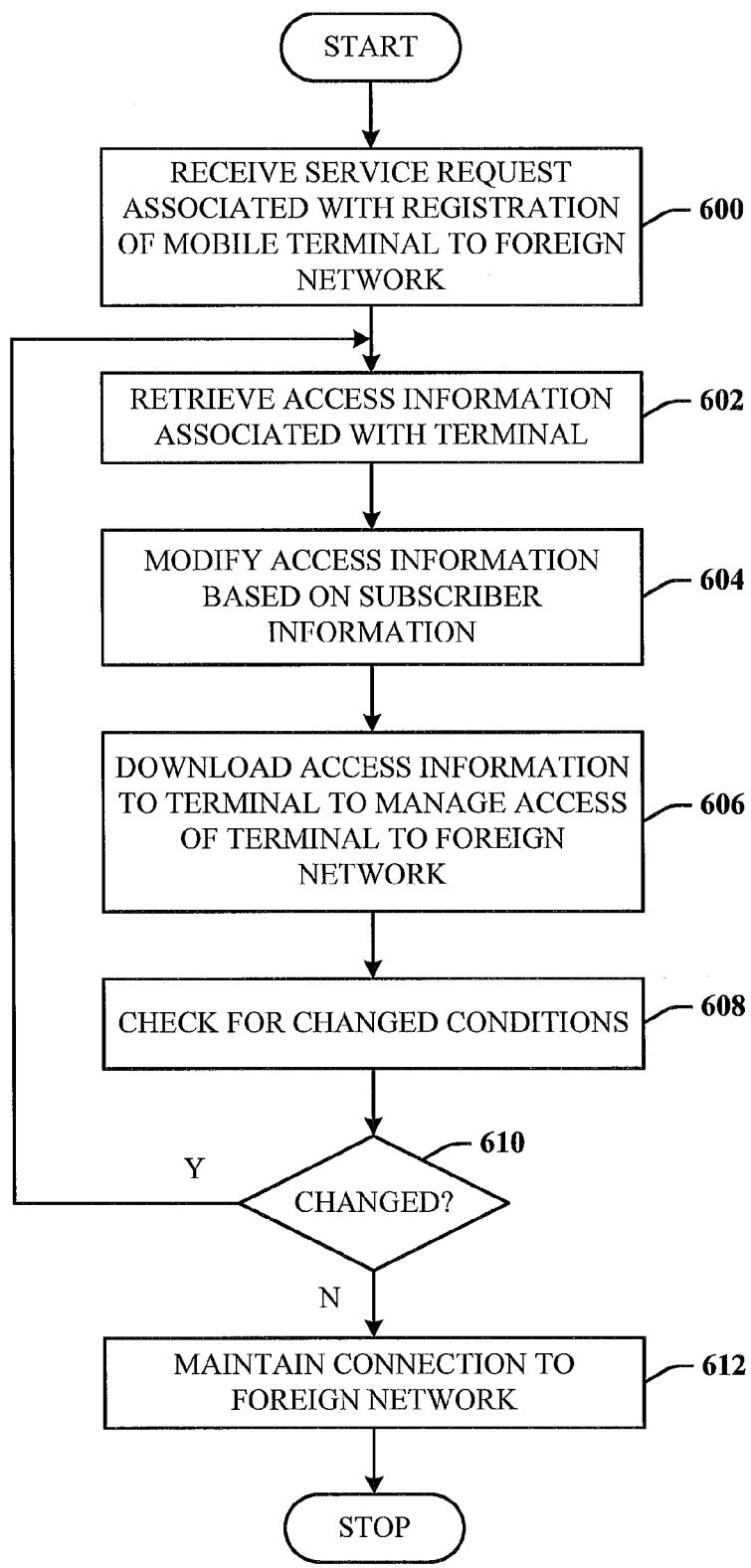
FIG. 6 illustrates an alternative methodology of dynamically managing customer access to cellular services.

FIG. 6 illustrates an alternative methodology of dynamically managing customer access to cellular services. At 600, a service request associated with registration of a mobile terminal to a foreign network is received, the request received at a home network. At 602, the home network retrieves access information associated with the terminal. In one implementation, the access information is retrieved from the roaming terminal. Alternatively, the access information can be retrieved from a home network cache system or database system. At 604, the access information is modified based on subscriber information. At 606, the modified access information is downloaded to the terminal to remotely manage access of the terminal to the foreign network. At 608, a check is made for changed conditions. This can include determining that the subscriber has roamed into network coverage where the rates are less expensive or that existing network loading conditions are changing, for example. At 610, if no changes are detected, flow is to 612 to maintain the connection to the current foreign network. If conditions have changed, flow is from 610 back to 602 to again, retrieve the access information, modify it, and download the information to the terminal to manage terminal access.

Figure 7:
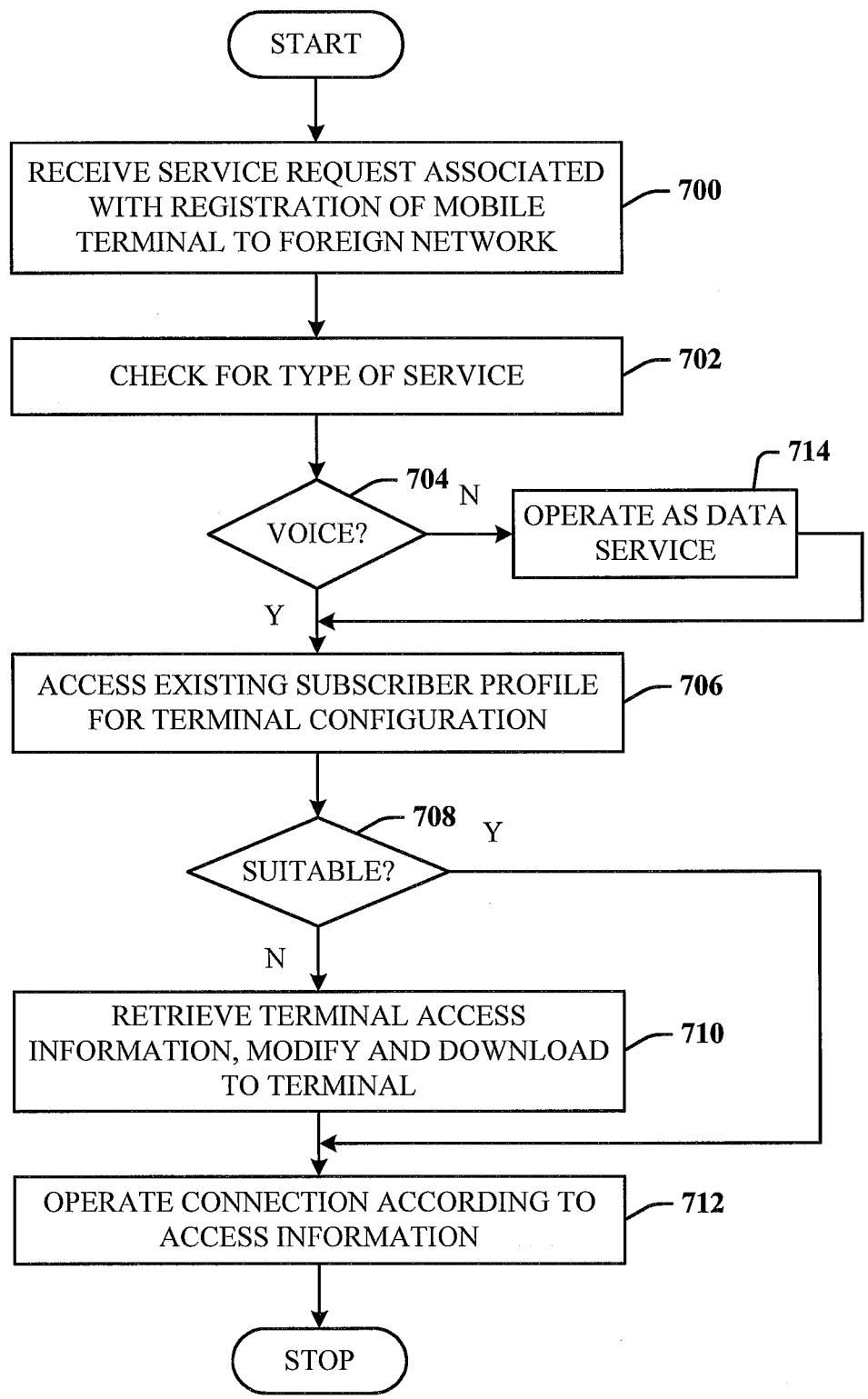
FIG. 7 illustrates a methodology of dynamically managing a terminal based on the type of service requested.

FIG. 7 illustrates a methodology of dynamically managing a terminal based on the type of service requested (e.g., voice or data). At 700, a service request associated with registration of a mobile terminal to a network (e.g., international, national, regional, etc.) is received, the request received at a home network. At 702, a check is made for the type of service requested by the terminal. At 704, if voice service is requested, flow is to 706 to access the existing subscriber profile from the home network for the current terminal configuration. At 708, the system then checks if the configuration is suitable for the service requested. If not, flow is to 710 to retrieve the terminal access information, modify it according to the desired parameters and settings, and download the modified access information to the terminal. At 712, the terminal connection is then operated according to the access information. If the existing configuration is suitable for the requested connection, flow is from 708 to 712 to then operate the connection according to the existing access information. If the service requested is not voice, then at 704, flow is to 714 to operate as a data service, and flow proceeds as with the described voice service, but modifying the access information according to data parameters and settings. The above method applies to any geographically-located network.

Figure 8:
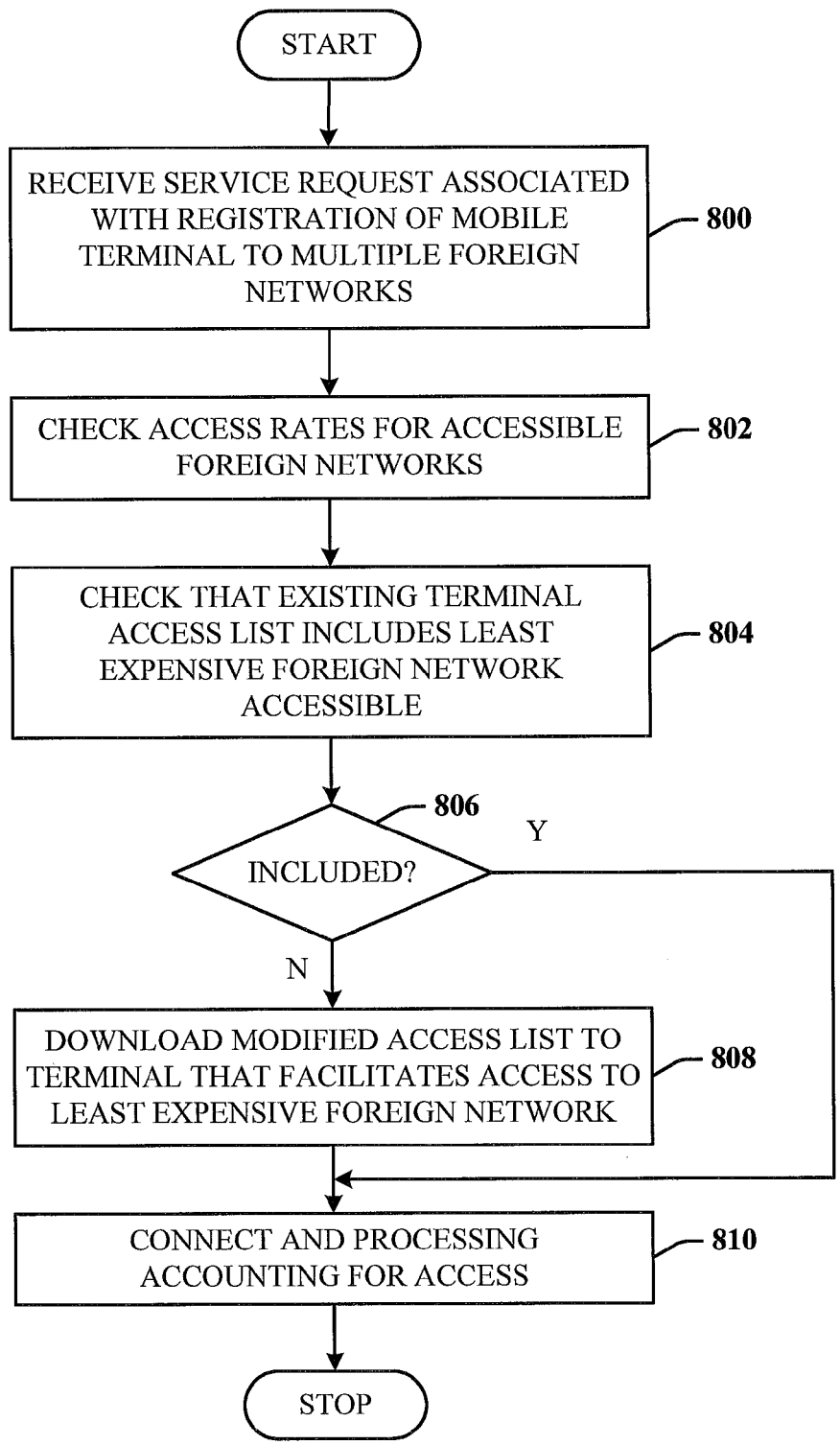
FIG. 8 illustrates a methodology of changing terminal access based on network access rates.

FIG. 8 illustrates a methodology of changing terminal access based on network access rates. At 800, a service request associated with registration of a mobile terminal to a foreign network is received, the request received at a home network. At 802, access rates for accessible foreign networks are checked. At 804, a check is made to determine if the existing terminal access list includes a least expensive foreign network that is accessible. At 806, if not included, flow is to 808, to download a modified access list to the terminal that facilitates access to the least expensive foreign network. At 810, the terminal is then connected, and accounting occurs at the reduced network rate.

Figure 9:
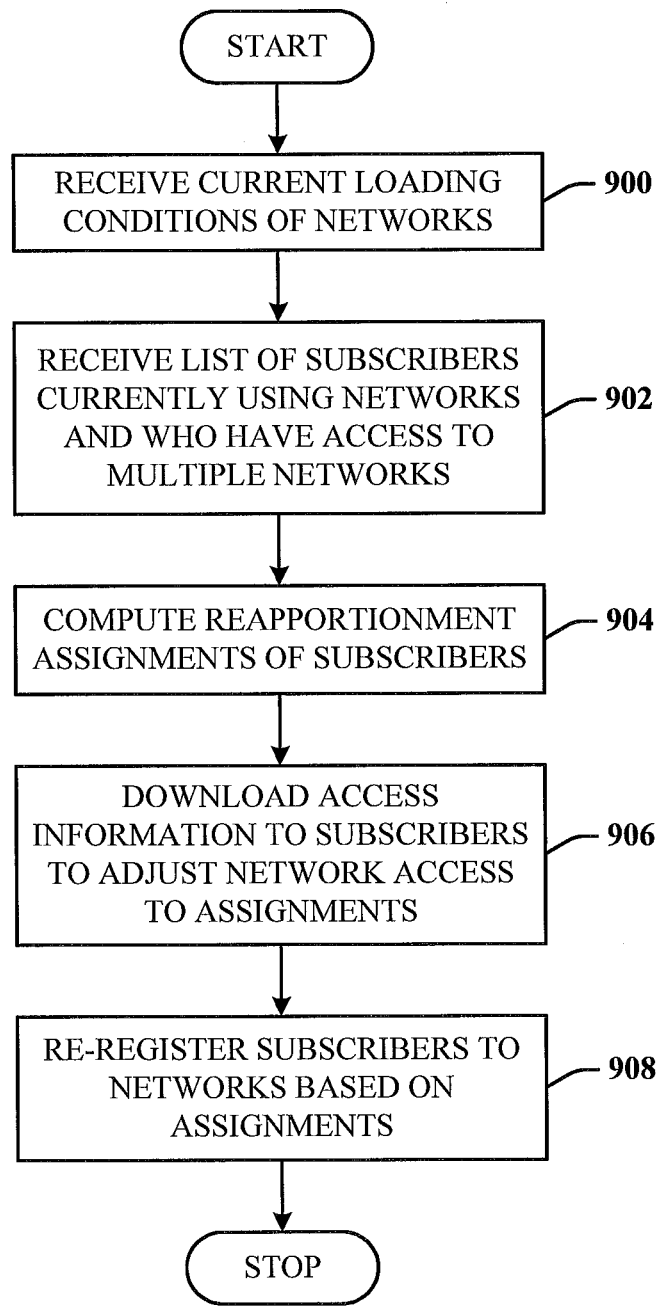
FIG. 9 illustrates a methodology of apportioning network load based on dynamic management of subscriber terminals.

FIG. 9 illustrates a methodology of apportioning network load based on dynamic management of subscriber terminals. At 900, current network loading conditions of multiple networks are received. At 902, a list of subscribers currently using the networks and that have access to multiple networks is received. At 904, reapportionment assignments are computed. At 906, access information is downloaded to the subscribers to adjust network access according to the assignments. At 908, the subscribers are re-registered to the networks based on the assignments. Re-registration can be performed the next time that the subscriber attempts to connect to a network.

Figure 10:
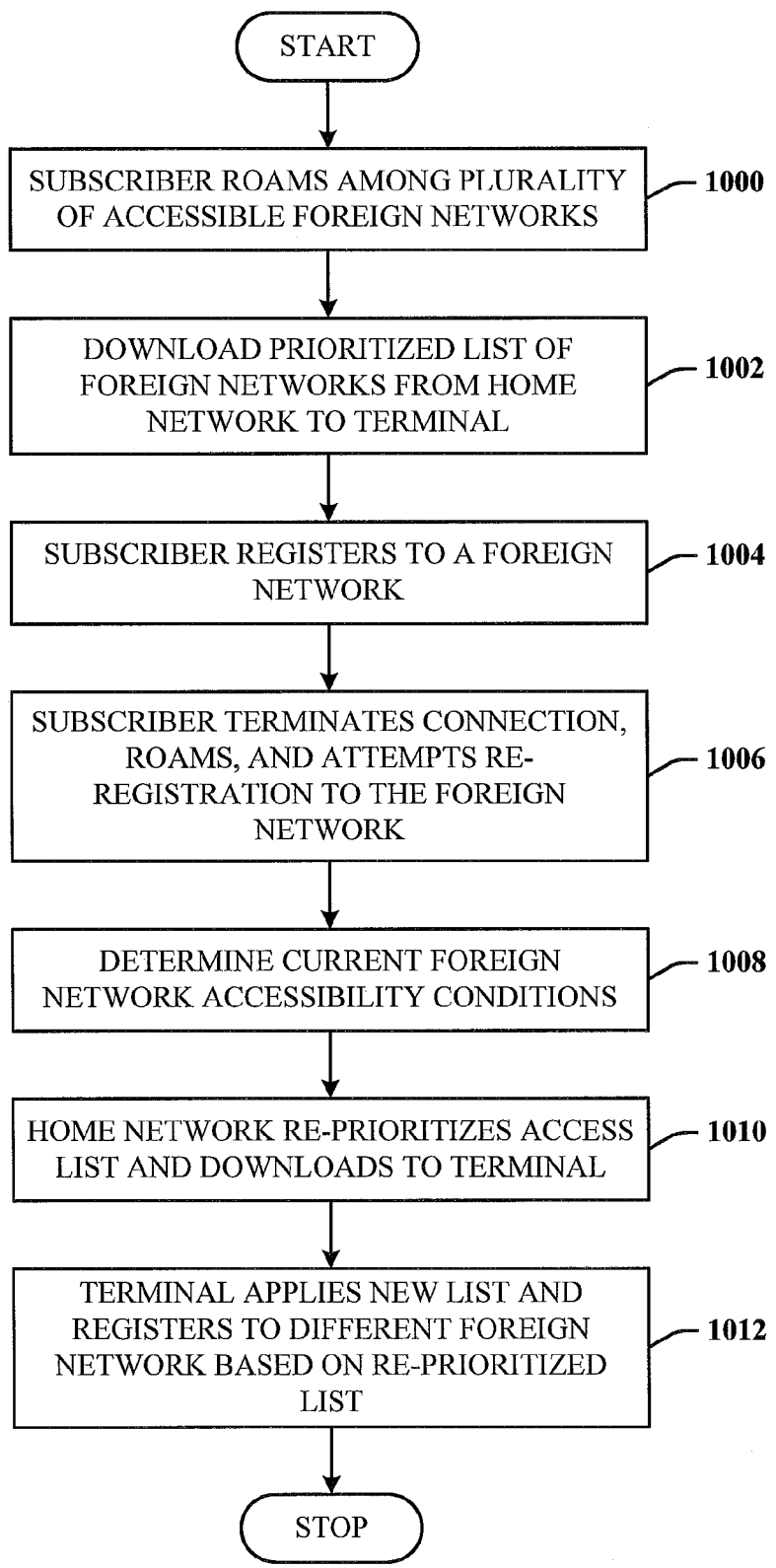
FIG. 10 illustrates an alternative methodology of apportioning network access based on dynamic management of subscriber terminals.

FIG. 10 illustrates an alternative methodology of apportioning network access based on dynamic management of subscriber terminals. At 1000, the subscriber roams among a plurality of accessible foreign networks. At 1002, a prioritized access list of foreign networks is downloaded from the home network to the subscriber terminal. At 1004, the subscriber registers to a foreign network. At 1006, the subscriber terminates the connection, roams, and attempts re-registration to the network. At 1008, current foreign network accessibility conditions are determined. At 1010, the home network re-prioritizes the access list and downloads the list to the subscriber terminal. At 1012, the terminal applies the new access list and registers to a different foreign network based on the re-prioritized list. As previously indicated, the apportionment algorithm can modify the access list based on proximity to apportionment goals by steering some roaming subscriber away from some networks and to other networks, for example.

In the context of a 2G network, roamer selection (the overall functionality of the disclosed architecture) works by inspecting GSM MAP Update Location messages forwarded to the roamer servers and determining whether to accept the registration on a specific carrier. The roamer selection sends PLMN updates to roaming subscribers OTA providing enhanced subscriber direction toward specific international carriers by country, country zone, and one or more rules. Roamer selection provides subscriber steering thereby providing cost-aware subscriber direction. Additionally, roamer selection does not require any additional investments in handsets or SIM cards, and does not require transitioning subscribers from current services.

Roamer selection allows the home network to manage international roaming costs, to segment customers by service attributes or preferred rate period, to control customer network acquisition, and to override handset manual network selection. Roaming discount negotiations, improved service for data services customers, and CAMEL (customized applications for mobile networks enhanced logic)-capable network selection are also enabled. In addition, the disclosed roamer selection architecture provides the ability to steer subscribers in areas along the geographic borders (e.g., Canada and Mexico) back to home networks or to a preferred international carrier. Roamer selection can also steer subscribers for domestic regional preference as needed since the disclosed solution works regardless of subscriber location.

As previously indicated, the disclosed roamer selection solution uses a two-part method for steering subscribers, which involves sending targeted PLMN updates through the OTA platform and permitting subscriber handset registrations based on defined rules. Roamer selection overrides the "strongest first" method of roaming registration currently used by the home network to direct subscribers to the carrier or carriers of choice.

Following is a series of call flow diagrams that exemplify registration scenarios related to dynamic management of mobile terminals on networks in accordance with the invention.

Figure 11:
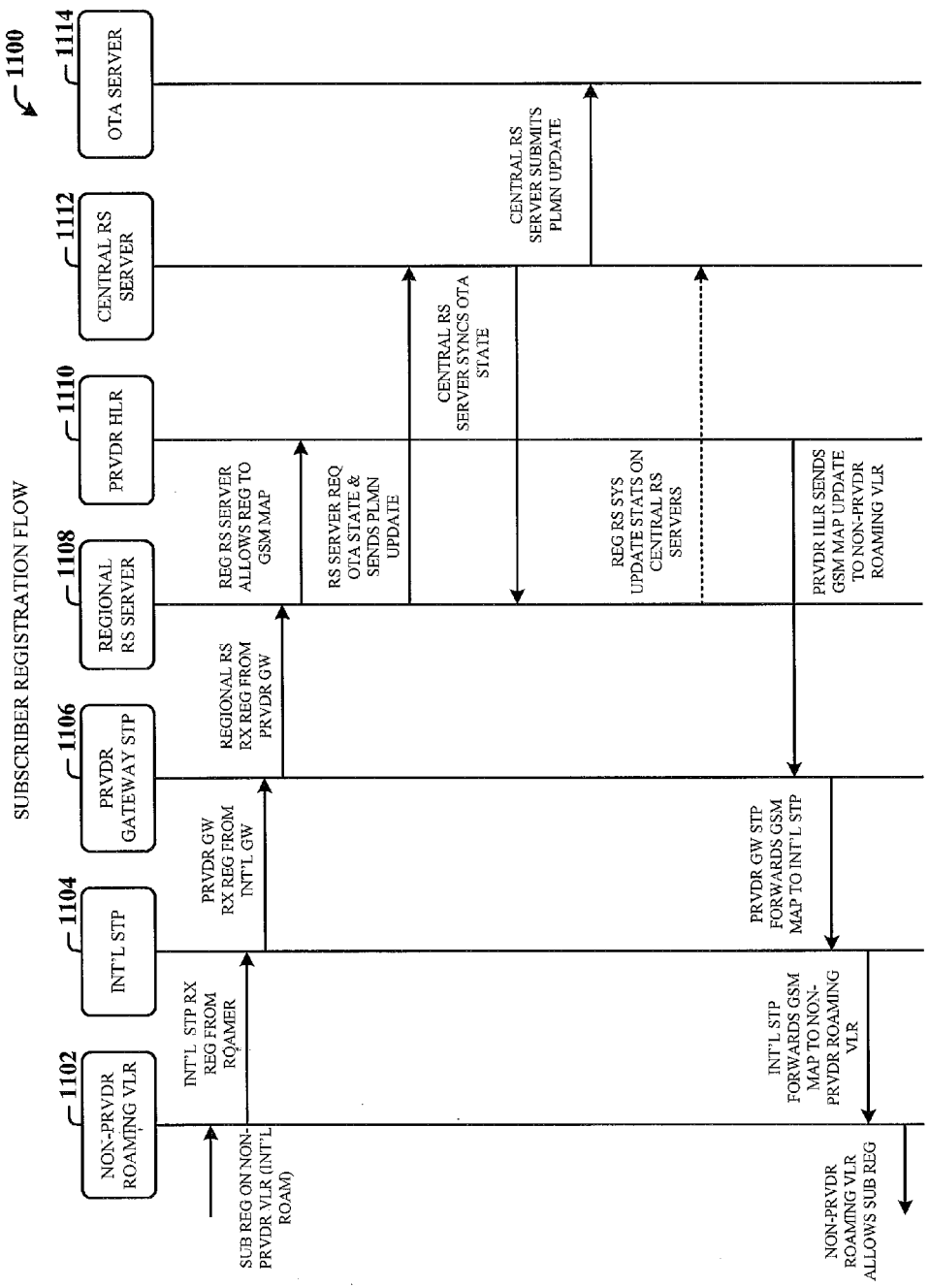
FIG. 11 illustrates a call flow diagram of an initial subscriber registration sequence.

FIG. 11 illustrates a call flow diagram of an initial subscriber registration sequence. Roamer selection can begin from a subscriber's perspective by accepting the subscriber's initial registration in a location. Accepting the initial registration allows roamer selection to send updated PLMN settings for the subscriber's location. At 1102, a subscriber registers on a foreign network (NON-PRVDR) VLR (e.g., international roaming). At 1104, an international STP receives the initial registration from the roaming subscriber. At 1106, a home (or provider-PRVDR) gateway STP receives the initial registration from the international STP. At 1108, a regional roamer selection server (e.g., roamer server 208 or server 408) receives the initial registration from the provider gateway STP. The regional roamer selection server allows the first registration (at 1110) and forwards a GSM MAP update location request to the home network HLR (at 1112) though the regional STP.

The regional roamer selection server requests both subscriber OTA state information and sends a PLMN update initiation request to the central roamer selection server at 1112. At 1112, the central server synchronizes the subscriber OTA state information on the regional roamer select systems based on the processed OTA events. At 1112, the central selection server submits a steering PLMN update to an OTA server (at 1114) to enhance network selection in the subsrciber location. At 1108, the regional select systems update statistics on the central servers periodically for problem resolution and customer support. The provider HLR sends a GSM MAP update response to the non-provider roaming VLR to the provider gateway STP, at 1106. At 1106, the gateway STP forwards the response to the international (NON-PRVDR) STP, which forwards the response to the NON-PRVDR roaming VLR at 1102. The roaming VLR allows the subscriber registration. The VLR and the HLR can now converse independent of the roaming select architecture.

Figure 12:
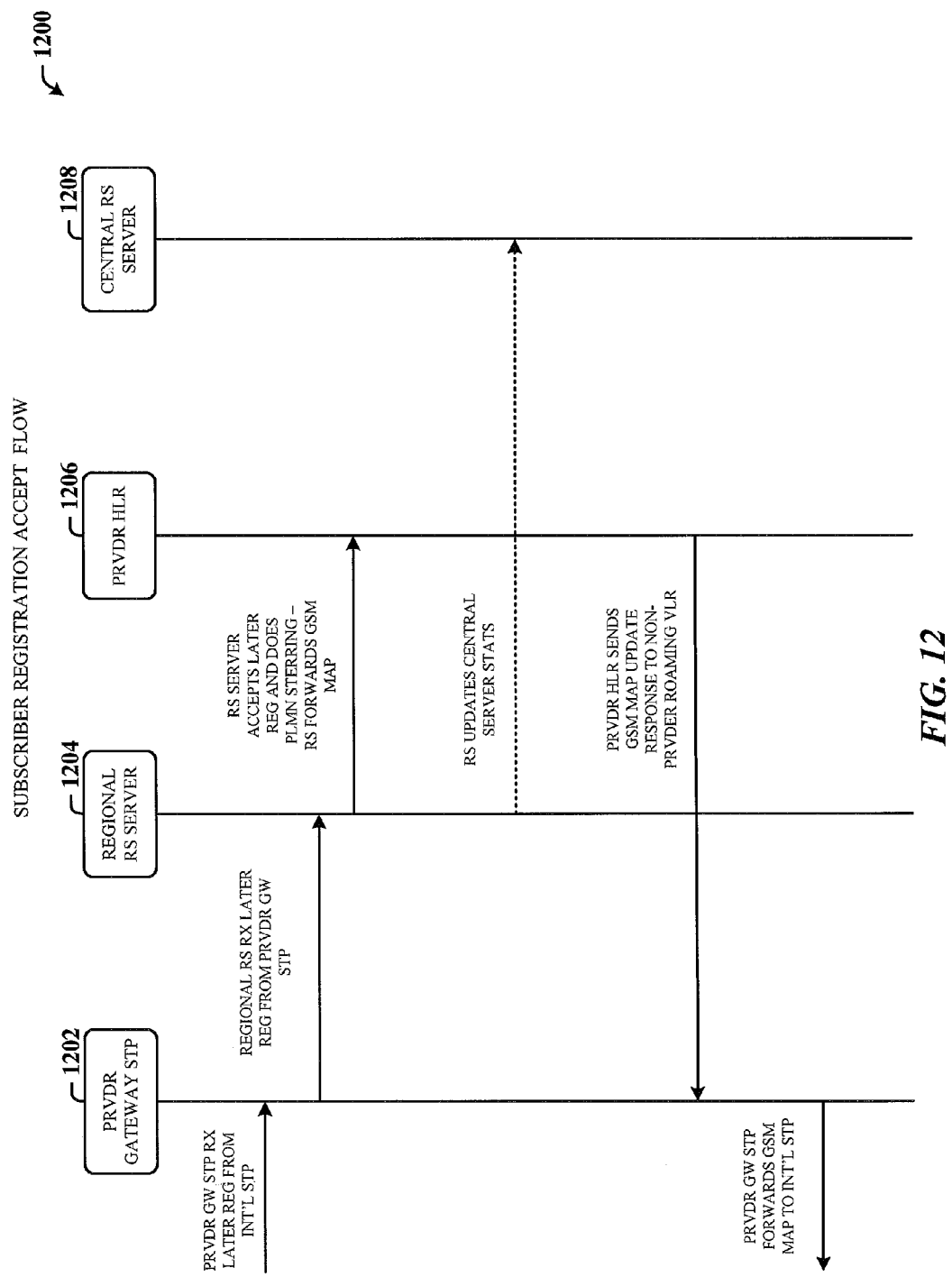
FIG. 12 illustrates a call flow diagram of an accept path for all accepted registrations.

FIG. 12 illustrates a call flow diagram 1200 of an accept path for all accepted registrations. The roamer select server can accept or deny subsequent registrations based on blacklist rules and balance rules. The diagram 1200 illustrates the sequence of steps involved with accepting a subscriber's subsequent registration. At 1202, the home network (PRVDR) gateway STP receives a subsequent registration from the international STP. At 1204, the regional select server receives the subsequent registration from the provider gateway STP. At 1206, the roamer selection server accepts the subsequent registration and performs PLMN steering based on matching balance rule parameters. The selection server forwards a GSM MAP update request to the provider HLR (at 1206). The selection server updates the central server statistics periodically (at 1208). At 1206, the provider HLR sends an update response to the non-provider roaming VLR via the provider gateway STP. The provider gateway STP then forwards the response to the non-provider STP.

When the roamer selection system decides to accept a subscriber's roaming registration, it re-addresses the SS7 logical unit associated with the registration to a global title translation (GTT) format. The selection system then sends an update location message to the appropriate STP which forwards the message to the appropriate HLR. The HLR then takes over messaging for the subscriber registration by responding to the non-provider roaming VLR. The selection system updates its counters and cache data to indicate that the subscriber IMSI was accepted. This includes clearing the metrics associated with subscriber registration maximum registration attempts and the maximum time for registration. The roamer selection system can write historical data for technical support with the action and IMSI. The HLR sends an ISD (insert subscriber data) request to the non-provider roaming VLR directly and takes control of the registration. The roamer selection system no longer remains involved with this specific registration.

Figure 13:
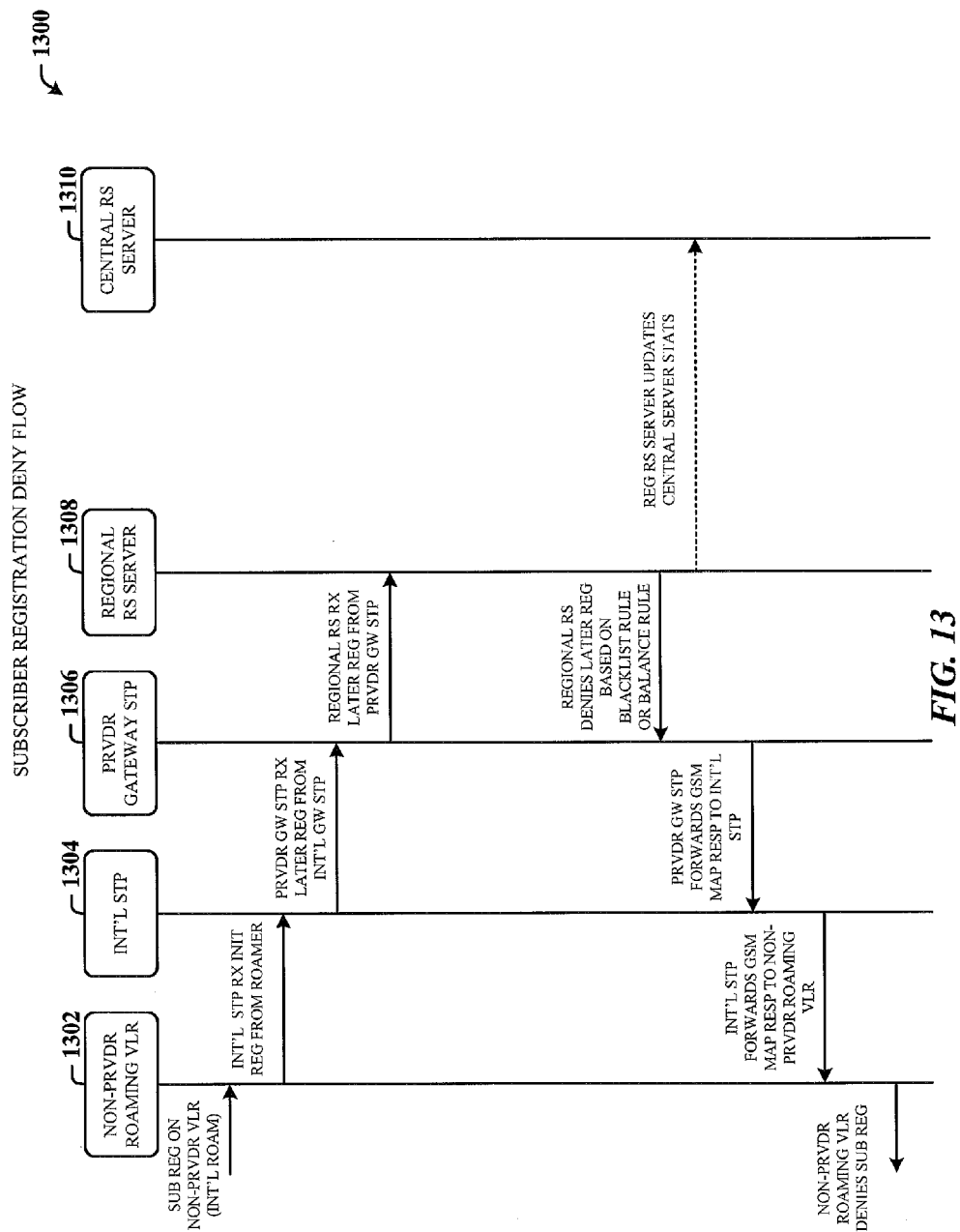
FIG. 13 illustrates a call flow diagram of a deny path for all denied registrations.

FIG. 13 illustrates a call flow diagram 1300 of a deny path for all denied registrations. At 1302, a subscriber registers on a non-provider VLR (e.g., international roaming). At 1304, an international STP receives the initial registration from the roaming subscriber. At 1306, a provider gateway STP receives a subsequent registration from the international STP. At 1308, a regional roamer selection server receives the subsequent registration from the provider gateway STP. The regional selection server denies the subsequent registration based on matching blacklist or balance rule parameters. At 1310, the selection server replies directly to the non-provider roaming VLR with an update location response containing a condition code for denying the registration. The selection server also periodically updates the central server statistics. At 1306, the provider gateway STP forwards the response to the international STP, which STP then forwards the response to the non-provider roaming VLR. The VLR then denies the subscriber registration.

When the roamer selection system decides to deny a subscriber's roaming registration, it replies directly to the non-provider VLR with an appropriate condition code (also known as the GSM MAP Update Location response user error code). In general, the roamer selection system sends condition codes 11 or 17, which correspond to "teleservice not provisioned" and "error status" GSM MAP errors, as defined in 3GPP TS 29.02. The roamer selection system updates cache management information for the specific subscriber prior to performing the deny path for the registration. The selection system updates its counters and cache data to indicate that the subscriber IMSI was denied, with the reason code. This includes updating the registration attempts counter for the current location, and writing historical data for technical support with the action, IMSI, and reason code.

The roamer selection system provides node failover such that a node that fails has its operations immediately handled by its mated application. A provisioning data feed containing a list of subscribers enabled for roaming selection can be provided which includes the MSISDN (mobile station integrated services digital network), IMSI, ICCID (integrated circuit card identifier), and IMEI (international mobile equipment identity) for the provider-provisioned handset, as well as subscriber state flags for 2G data services, 3G data services, and VIP status. This provisioning data feed updates the central roamer selection servers regularly (e.g., nightly). In addition, on-demand information updates can also be configured. This functionality operates as a "single push" mechanism for provisioning data to the central roamer selection servers. The central selection servers can update the regional selection servers for nightly updates as well as on-demand updates for individual subscribers.

Following is a more detailed description of usage scenarios in accordance with the disclose roamer selection architecture.

The roamer selection system handles the case where no customer segment steering exists for a received SS7 LU (logical unit) by using the zone, country, and default processing rules mapped from the E.164 identifier for the carrier VLR.

Prior to performing any roamer selection system processing rules, the system will check the blacklist rules. The blacklist rules override roamer selection system processing rules.

The rules selection component (component 116 of FIG. 1) receives a registration LU from the SS7 messaging component. The rules selection component first attempts to match the IMSI to a blacklist rule. If a blacklist rule match is found for the IMSI, the rules selection component performs the deny path above. The rules selection component attempts to match the foreign carrier VLR E.164 identifier to a blacklist rule. If the roamer selection system finds a blacklist rule match for the E.164 identifier, the rules selection component performs the deny path described above. The roamer selection system concludes matching blacklist rules and begins to process balance rules, which include balance groups and processing rules.

The roamer selection system attempts to retrieve IT data from the cache for the subscriber. If the data is missing, the missing data is treated as if there were no segment defined. If the data is present, the segment is calculated based on the data present. The roamer selection system attempts to match the segment to a processing rule. Since this use case assumes the segment does not match a rule, the roamer selection system treats the registration as if there were no segment defined. The roamer selection system determines if a customer service representative forced the subscriber to a specific network for a zone and country. If the subscriber registered in this zone and country, override any balance rules by performing the accept path as described above.

The roamer selection system can attempt processing rule matches by thresholds, for example:

The roamer selection system verifies if the registration metrics maintained by the cache management component for the subscriber match the current location. If the metrics do not match the current location, the metrics related to thresholds which include the maximum registration count and the maximum time threshold are reset.

The roamer selection system determines if the matching balance rule by zone, country, or carrier or the default rule indicates that the subscriber has exceeded the maximum registration count. If the subscriber has exceeded the maximum registration count, the rules selection component performs the accept path described above.

The roamer selection system determines if the matching balance rule by zone, country, or carrier or the default rule indicates that the subscriber has exceeded the maximum time threshold. If the subscriber has exceeded the maximum time threshold, the rules selection component performs the accept path described above.

The roamer selection system determines if the matching balance rule by zone, country, or carrier or the default rule requires an adjustment to the apportioning for a carrier. The rules selection component determines which carrier should register the subscriber based on proximity to the apportioning thresholds, adjusting the balance action performed for the processing rule.

The roamer selection system determines whether the minimum deny count applies for the registration based on a balance rule preferencing match. If the subscriber is below the minimum deny threshold for the appropriate match, perform the deny path described above.

The roamer selection system attempts a rule match based on the carrier VLR E.164 identifier mapping to a zone, country, and carrier first before matching the registration by default rule. The roamer selection system performs these operations in the following order:

The roamer selection system checks the PLMN download status for a subscriber and uses the download status as part of balance rule matches. The download status is valid only when the download reflects a valid download for the registration location. If the download status is not valid, the system ignores the download status and resets it.

If the rules selection component finds a match by zone, it performs the accept or deny action and balance action associated with the match. If the rules selection component finds a match by country, it performs the accept or deny action and balance action associated with the match. If the rules selection component finds a match by carrier, it performs the accept or deny action and balance action associated with the match. If the rules selection component finds a match to the default rule, it performs the accept or deny action and balance action associated with the match. The roamer selection system performs a default accept rule since it cannot match any rules to accept or deny the registration.

The roamer selection system submits a PLMN download if the PLMN settings differ from the last roamer selection system PLMN settings downloaded to the subscriber's SIM or USIM card.

The rules selection component updates the cache with accept and deny statistics, rule selection metrics, and historical information. The rules selection component and cache write technical support log information for diagnostic troubleshooting.

The roamer selection system handles the case where a non-preferred or disallowed carrier registration LU is received. An exemplary usage narrative is as follows. The roamer selection system handles non-preferred or disallowed carrier registration through the E.164 VLR identifier blacklist and balance rule balance methods. For blacklisted carrier registrations, the roamer selection system performs the deny path desacribed above. Non-preferred carrier registrations are handled through balance rules which determine if the registration meets the balance criteria for the appropriate rule. In general, the roamer selection system attempts to optimize balance by performing a proximity check against the balance thresholds which include allocated and actual balance percentages per carrier. This ensures that the roamer selection system does not perform excessive balance and PLMN updates. Non-preferred carrier registrations which do not match a roamer selection system processing rule are handled by the accept path described above. E.164 VLR identifier blacklist rules are checked prior to matching roamer selection system processing rules.

More specifically, the rules selection component receives a registration LU from the SS7 messaging component. The rules selection component first attempts to match the IMSI to a blacklist rule. If a blacklist rule match for the IMSI is found, the rules selection component performs the deny path described above. This occurs even if the carrier registration is otherwise barred, since the IMSI list overrides the VLR E.164 blacklist. The rules selection component attempts to match the foreign carrier VLR E.164 identifier to a blacklist rule. If RSS finds a blacklist rule match for the E.164 identifier, the rules selection component performs the deny path described above.

The roamer selection system concludes matching blacklist rules and begins to balance rules, which include balance groups and processing rules, based on the use case scenario provided herein. The roamer selection system attempts to retrieve IT data from the cache for the subscriber. If the data is missing, the roamer selection system treats the missing data as if there were no segment defined. The roamer selection system attempts to match the segment to a processing rule. If the processing rule is missing, the system treats the missing rule as if there were no segment defined. If the data is present, the roamer selection system calculates the segment based on the data present. The roamer selection system determines if a customer service representative forced the subscriber to a specific network for a zone and country. If the subscriber registered in this zone and country, override any balance rules by performing the accept path as described above.

The roamer selection system attempts processing rule matches by thresholds. The roamer selection system verifies whether the registration metrics maintained by the cache management component for the subscriber match the current location. If the metrics do not match the current location, the metrics related to thresholds which include the maximum registration count and the maximum time threshold are reset.

The roamer selection system determines whether the matching balance rule by zone, country, carrier, or segment or the default rule indicates that the subscriber has exceeded the maximum registration count. If the subscriber has exceeded the maximum registration count, the rules selection component performs the accept path described above. This occurs regardless of whether the carrier is non-preferred, although it does not occur if the carrier is blacklisted.

The roamer selection system determines if the matching balance rule by zone, country, carrier, or segment or the default rule indicates that the subscriber has exceeded the maximum time threshold. If the subscriber has exceeded the maximum time threshold, the rules selection component performs the accept path described above. This occurs regardless of whether the carrier is non-preferred, although it does not occur if the carrier is blacklisted.

The roamer selection system determines if the matching balance rule by zone, country, carrier, or segment or the default rule requires an adjustment to the apportioning for a carrier. The rules selection component determines which carrier should register the subscriber based on proximity to the apportioning thresholds, adjusting the balance action performed for the processing rule. This occurs regardless of whether the carrier is non-preferred, although it does not occur if the carrier is blacklisted.

The roamer selection system determines whether the minimum deny count applies for the registration based on a balance rule preferencing match. If the subscriber is below the minimum deny threshold for the appropriate match, the deny path described above is performed.

The roamer selection system attempts a rule match based on the carrier VLR E.164 identifier mapping to a zone, country, and carrier first before matching the registration by segment or default rule and performs these operations in the following illustrative order:

The roamer selection system checks the PLMN download status for a subscriber and uses the download status as part of balance rule matches. The download status is valid only when the download reflects a valid download for the registration location. If the download status is not valid, the download status is ignored and reset. The roamer selection system then attempts a balance rule match by zone. If the rules selection component finds a match, it performs the accept or deny action and balance action associated with the match. If the rules selection component finds a match by country, it performs the accept or deny action and balance action associated with the match. If the rules selection component finds a match by carrier, it performs the accept or deny action and balance action associated with the match. If the rules selection component finds a match by segment, it performs the accept or deny action and balance action associated with the match. If the rules selection component finds a match to the default rule, it performs the accept or deny action and balance action associated with the match. The roamer selection system performs a default accept rule since it cannot match any rules to accept or deny the registration.

The roamer selection system submits a PLMN download if the PLMN settings differ from the last PLMN settings downloaded to the subscriber's SIM or USIM card. The rules selection component updates the cache with accept and deny statistics, rule selection metrics, and historical information. The rules selection component and cache write technical support log information for diagnostic troubleshooting.

Following is a more detailed description of an exemplary first registration attempt LU received for a location. This use case describes the first registration attempt LU for a subscriber in a location, which means the first time the roamer selection system receives an LU from a location rather than a specific carrier VLR. For roamer selection system purposes, a location means a zone or country associated with a carrier VLR E.164 identifier. A subscriber can move to another VLR within the same zone or country and still remain in the same location for roamer selection system purposes even though the subscriber may have traveled a considerable distance. Subsequent registrations on different VLRs within the same zone or country are treated as subsequent registrations instead of first registrations.

The roamer selection system accepts the first registration attempt in a location to facilitate PLMN steering. Once the first registration attempt is accepted it delivers a PLMN update to assist in steering the subscriber to the carrier chosen. Handset PLMN scanning at regular intervals steers subscribers off disallowed and non-preferred carriers. The roamer selection system will not accept registration attempts for blacklisted IMSIs.

The roamer selection system can reset metrics associated with a previous subscriber location for a first registration attempt in a new location. This includes resetting the maximum registration attempt count and the maximum time to register period since these metrics apply to another location. This use case also covers instances where a subscriber first registers on a roaming VLR in location A and then registers on a roaming VLR in location B. For instance, a subscriber could first power up a handset in the United Kingdom and register on Vodafone UK prior to entering the Channel Tunnel. During the journey to France by the Channel Tunnel the subscriber registers in France. The roamer selection system treats the initial registrations in the United Kingdom and France as first attempts.

The following primary usage scenario applies to the first registration LU attempt received for a location. The rules selection component receives a registration LU from the SS7 messaging component. The rules selection component attempts to match the IMSI to a blacklist rule first. If the roamer selection system finds a blacklist rule match for the IMSI, the rules selection component performs the deny path described above. This occurs even if the carrier registration is otherwise barred since the IMSI list overrides the VLR E.164 blacklist. The rules selection component determines whether the registration is the first attempt for a location.

If the registration is the first attempt for a location, the following steps are performed. The subscriber registration metrics are reset since the subscriber registered in a new location. An OTA update is sent for the location using OTA parameters as described above. The roamer selection system submits a PLMN download if the PLMN settings differ from the last selection system PLMN settings downloaded to the subscriber's SIM or USIM card. The subscriber registration is accepted using the accept path logic described above. The rules selection component updates the cache with accept and deny statistics, rule selection metrics, and historical information and, the rule component and cache write technical support log information for diagnostic troubleshooting.

Following is a description of a use case for a subsequent registration attempt for a subscriber in the same location, which means the subscriber has already made a first attempt at registration in the location. A location means a zone or country associated with a carrier VLR E.164 identifier. A subscriber can move to another VLR within the same zone or country and still remain in the same location for selection system purposes even though the subscriber may have traveled a considerable distance. Subsequent registrations on different VLRs within the same zone or country are treated as subsequent registrations instead of first registrations.

A subsequent attempt at registration usually does not require a PLMN update unless a previous PLMN update delivery attempt failed. Rule processing does not require the PLMN update to deliver although the rule processing component checks PLMN status as part of rule processing. Normal blacklist rule and balance rule processing guides the subscriber's registration for a subsequent registration attempt as performed for an initial registration attempt. The roamer selection system updates metrics associated with the current subscriber location as part of processing a subsequent registration. This includes updating the registration attempt count and verifying the maximum time to register period since these metrics apply to the current location. In the event that the carrier VLR E.164 identifier matches another location, the registration is processed as a first registration as described above. The rule processing component will produce an accept or deny action with a condition code based on the received LU. The roamer selection system will update the cache with event metrics and actions based on the received LU and write historical information for technical support.

The following primary usage scenario applies to a subsequent registration attempt LU received for the same location. The rules selection component receives a registration LU from the SS7 messaging component and attempts to match the IMSI to a blacklist rule first. If a blacklist rule match for the IMSI is found, the rules selection component performs the deny path described above.

The rules selection component attempts to match the foreign carrier VLR E.164 identifier to a blacklist rule. If a blacklist rule match for the E.164 identifier is found, the rules selection component performs the deny path described above. The roamer selection system concludes matching blacklist rules and begins to balance rules, which include balance groups and processing rules.

The roamer selection system attempts to retrieve IT data from the cache for the subscriber. If the data is missing, the missing data is treated as if there were no segment defined. If the data is present, the segment is calculated based on the data present. The roamer selection system attempts to match the segment to a processing rule. If the processing rule is missing, the missing rule is treated as if there were no segment defined.

The roamer selection system determines if a customer service representative forced the subscriber to a specific network for a zone and country. If the subscriber registered in this zone and country, the system will override any balance rules by performing the accept path as described above.

The roamer selection system attempts processing rule matches by thresholds. The roamer selection system verifies if the registration metrics maintained by the cache management component for the subscriber match the current location. If the metrics do not match the current location, the metrics related to thresholds which include the maximum registration count and the maximum time threshold are reset. For this use case, the metrics do match the current location and are updated as part of this use case.

The roamer selection system determines if the matching balance rule by zone, country, carrier, or segment or the default rule indicates that the subscriber has exceeded the maximum registration count. If the subscriber has exceeded the maximum registration count, the rules selection component performs the accept path described above. This occurs regardless of whether the carrier is non-preferred, although it does not occur if the carrier is blacklisted.

The roamer selection system determines if the matching balance rule by zone, country, carrier, or segment or the default rule indicates that the subscriber has exceeded the maximum time threshold. If the subscriber has exceeded the maximum time threshold, the rules selection component performs the accept path described above. This occurs regardless of whether the carrier is non-preferred, although it does not occur if the carrier is blacklisted.

The roamer selection system determines if the matching balance rule by zone, country, carrier, or segment or the default rule requires an adjustment to the apportioning for a carrier. The rules selection component determines which carrier should register the subscriber based on proximity to the apportioning thresholds, adjusting the balance action performed for the processing rule. This occurs regardless of whether the carrier is non-preferred, although it does not occur if the carrier is blacklisted.

The roamer selection system determines whether the minimum deny count applies for the registration based on a balance rule preferencing match. If the subscriber is below the minimum deny threshold for the appropriate match, the deny path described above is performed.

The roamer selection system attempts a rule match based on the carrier VLR E.164 identifier mapping to a zone, country, and carrier first before matching the registration by segment or default rule, and performs these operations in the following illustrative order:

The roamer selection system checks the PLMN download status for a subscriber and uses the download status as part of balance rule matches. The download status is valid only when the download reflects a valid download for the registration location. If the download status is not valid, the download status is ignored and reset. If the rules selection component finds a match by zone, it performs the accept or deny action and balance action associated with the match. If the rules selection component finds a match by country, it performs the accept or deny action and balance action associated with the match. If the rules selection component finds a match by carrier, it performs the accept or deny action and balance action associated with the match.

If the rules selection component finds a match by segment, it performs the accept or deny action and balance action associated with the match. If the rules selection component finds a match to the default rule, it performs the accept or deny action and balance action associated with the match. The roamer selection system performs a default accept rule since it cannot match any rules to accept or deny the registration. The roamer selection system submits a PLMN download if the PLMN settings differ from the last PLMN settings downloaded to the subscriber's SIM or USIM card. The rules selection component updates the cache with accept and deny statistics, rule selection metrics, and historical information and, the RSS rules selection component and RSS cache write technical support log information for diagnostic troubleshooting.

Blacklist IMSIs are denied roamer selection. For each blacklisted IMSI, the selection system performs the deny path logic described above. Blacklists carrier VLR E.164 identifiers which are denied registration. For each blacklisted carrier VLR E.164 identifier, the roamer selection system performs the deny path logic described above.

Blacklist rules preempt processing rules except for VIP status. In general, blacklist rules are processed before processing rules, although VIP status verification interleaves with blacklist rule processing. This allows blacklist rules to provide "short circuited" accept and deny functions.

Each blacklist rule can be paired with a time condition. The blacklist rule time conditions can be, a date and time after which the blacklist rule expires, and a time period when the blacklist rule is valid.

The following primary usage scenario applies to blacklist rules. In general, blacklist rules preempt processing rules and are processed before processing rules. The only exception is VIP processing which interleaves with blacklist rule processing. The rules selection component checks the subscriber's VIP setting after checking whether the IMSI is blacklisted and before checking whether the carrier VLR E.164 identifier is blacklisted. If the subscriber's has VIP set, the following actions are performed. Metrics associated with subscriber registrations are reset if the subscriber is in a new location. An OTA is scheduled if required for the registration based on whether the subscriber is in a new location. The VIP registration is accepted based on the allow path logic described above.

Roamer selection balance rules provide the basis for non-trivial roaming selection decisions. These balance rules are a combination of processing rules, which determine choice and the accept or deny action, and balance groups, which are groups used to determine how to direct subscribers to specific carriers based on balance proportions.

As used in this application, the terms "component" and "system" are intended to refer to hardware, a combination of hardware and software, software, or software in execution. For example, a component can be, but is not limited to being, a process running on a processor, a processor, a hard disk drive, multiple storage drives (of optical and/or magnetic storage medium), an object, an executable, a thread of execution, a program, and/or a computer or mobile terminal (cell phone).

Figure 14:
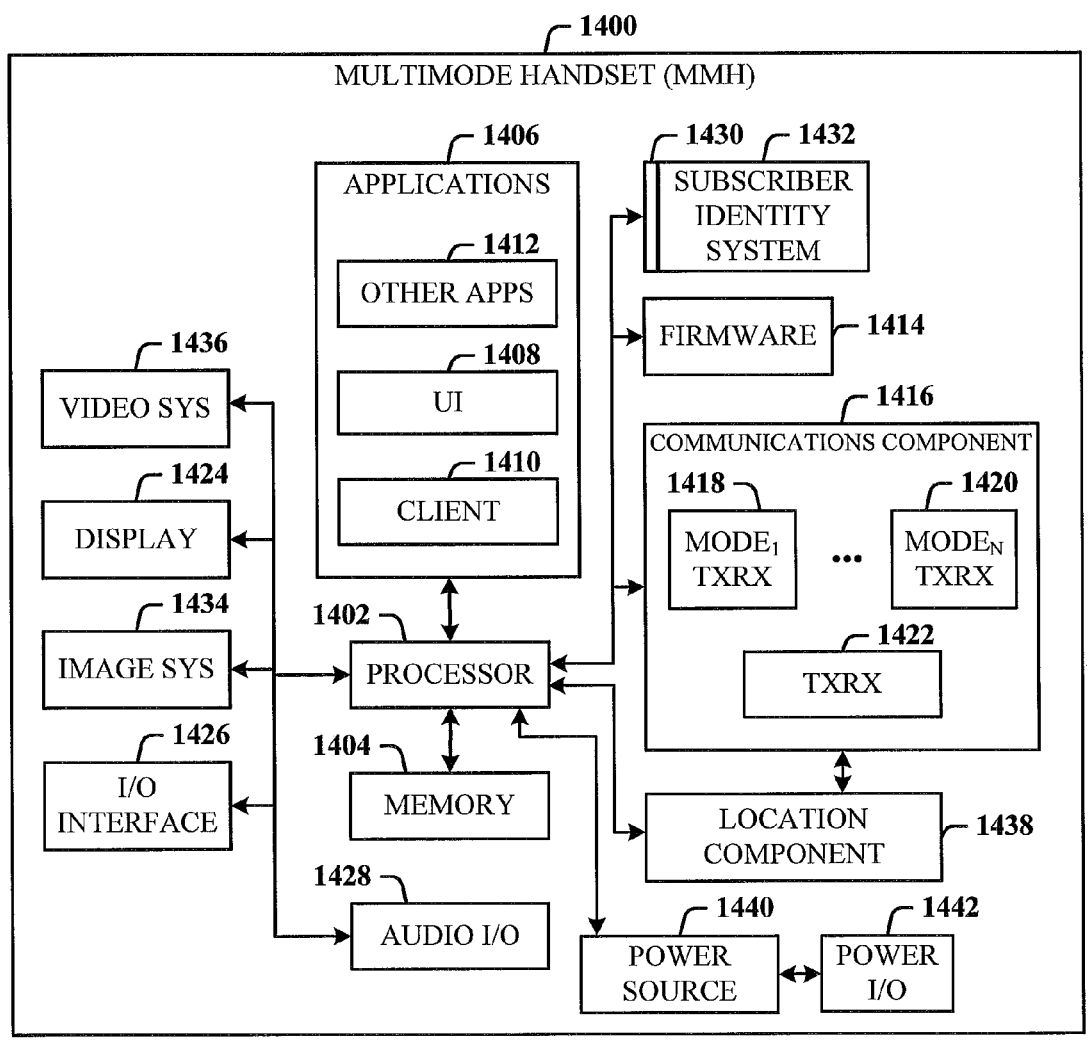
FIG. 14 illustrates a schematic block diagram of an exemplary multimode handset in accordance with an innovative aspect.

FIG. 14 illustrates a schematic block diagram of an exemplary multimode handset 1400 in accordance with an innovative aspect. In order to provide additional context for various aspects thereof, FIG. 14 and the following discussion are intended to provide a brief, general description of a suitable environment in which the various aspects of the innovation can be implemented. While the description includes a general context of computer-executable instructions, those skilled in the art will recognize that the innovation also can be implemented in combination with other program modules and/or as a combination of hardware and software.

Generally, applications (e.g., program modules) can include routines, programs, components, data structures, etc., that perform particular tasks or implement particular abstract data types. Moreover, those skilled in the art will appreciate that the inventive methods can be practiced with other system configurations, including single-processor or multiprocessor systems, minicomputers, mainframe computers, as well as personal computers, hand-held computing devices, microprocessor-based or programmable consumer electronics, and the like, each of which can be operatively coupled to one or more associated devices.

The handset 1400 (e.g., a cell phone) can typically include a variety of computer-readable media. Computer-readable media can be any available media accessed by the handset systems and includes volatile and non-volatile media, removable and non-removable media. By way of example, and not limitation, computer-readable media can comprise device storage media and communication media. Storage media includes volatile and/or non-volatile, removable and/or non-removable media implemented in any method or technology for the storage of information such as computer-readable instructions, data structures, program modules or other data. Storage media can include, but is not limited to, RAM, ROM, EEPROM, flash memory or other memory technology, CD-ROM, digital video disc (DVD) or other optical disk storage, magnetic tape, magnetic disk storage or other magnetic storage devices, or any other medium which can be used to store the desired information and which can be accessed by the handset systems.

The handset 1400 includes a processor 1402 for controlling and processing onboard operations and functions. A memory 1404 interfaces to the processor 1402 for the storage of data and one or more applications 1406 (e.g., a video player software, user feedback component software, etc.). The applications 1406 can also include a user interface (UI) application 1408 that operates with a client 1410 (e.g., operating system) to facilitate user interaction with handset functionality and data, for example, answering/initiating calls, entering/deleting data, configuring settings, address book manipulation, multimode interaction, etc. The applications 1406 can include other applications 1412 that came installed with the handset 1406 and/or can be installed as add-ons or plug-ins to the client 1410 and/or UI 1408, for example, or for other purposes (e.g., processor, firmware, etc.).

The other applications 1412 can include voice recognition of predetermined voice commands that facilitate user control, call voice processing, voice recording, messaging, e-mail processing, video processing, image processing, music play, as well as subsystems or components described infra. Some of the applications 1406 can be stored in the memory 1404 and/or in a firmware 1414, and executed by the processor 1402 from either or both the memory 1404 or/and the firmware 1414. The firmware 1414 can also store code for execution in power-up initialization and control during normal operation of the handset 1400.

A communications component 1416 can interface to the processor 1402 to facilitate wired/wireless communications with external systems, for example, cellular networks, VoIP (voice-over-IP) networks, local wireless networks or personal wireless networks such as Wi-Fi, Wi-Max, and so on. Here, the communications component 1416 can also include a multimode communications subsystem for providing cellular communications via different cellular technologies. For example, a first cellular transceiver 1418 (e.g., GSM) can be one mode and an Nth transceiver 1420 can provide cellular communications via an Nth cellular network (e.g., UMTS), where N is a positive integer. The communications component 1416 can also include a transceiver 1422 for unlicensed communications (e.g., Wi-Fi, Wi-Max, Bluetooth, etc.) for corresponding communications. The communications component 1416 can also facilitate communications reception from terrestrial radio networks (e.g., broadcast), digital satellite radio networks, and Internet-based radio services networks.

The handset 1400 can process IP data traffic via the communications component 1416 to accommodate IP traffic from an IP network such as, for example, the Internet, a corporate intranet, a home broadband network, a personal area network, etc., via an ISP or broadband cable provider. Thus, VoIP traffic can be utilized by the handset 1400 and IP-based multimedia content can be received in an encoded and/or decoded format.

The handset 1400 includes a display 1424 for displaying multimedia that include text, images, video, telephony functions (e.g., a Caller ID function), setup functions, menus, etc. The display 1424 can also accommodate the presentation of multimedia content (e.g., music metadata, messages, wallpaper, graphics, etc.).

An input/output (I/O) interface 1426 can be provided for serial/parallel I/O of data and/or signals (e.g., USB, and/or IEEE 1394) via a hardwire connection, and other I/O devices (e.g., a keyboard, keypad, mouse, interface tether, stylus pen, touch screen, etc.). The I/O interface 1426 can be utilized for updating and/or troubleshooting the handset 1400, for example.

Audio capabilities can be provided via an audio I/O component 1428, which can include a speaker for the output of audio signals related to, for example, indication that the user pressed the proper key or key combination to initiate the user feedback signal, call signals, music, etc. The audio I/O component 1428 also facilitates the input of audio signals via a microphone to record data and/or telephony voice data, and for inputting voice signals for telephone conversations.

The handset 1400 can include a slot interface 1430 for accommodating a subscriber identity system 1432 that can accommodate a SIM or universal SIM (USIM), and interfacing the subscriber identity system 1432 with the processor 1402. However, it is to be appreciated that the subscriber identity system 1432 can be manufactured into the handset 1400, and updated by downloading data and software thereinto, such as the access information described herein.

An image capture and processing system 1434 (e.g., a camera) can be provided for decoding encoded image content. Additionally, as indicated, photos can be obtained via an associated image capture subsystem of the image system 1434. The handset 1400 can also include a video component 1436 for processing video content received and, for recording and transmitting video content.

Optionally, a geolocation component 1438 (e.g., GPS-global positioning system) facilitates receiving geolocation signals (e.g., from satellites via the communications component 1416) that define the location of the handset 1400. Alternatively, or in combination therewith, the geolocation component 1438 can facilitate triangulation processing for locating the handset 1400.

The handset 1400 also includes a power source 1440 in the form of batteries and/or an AC power subsystem, which power source 1440 can interface to an external power system or charging equipment (not shown) via a power I/O component 1442.

The roamer selection system (e.g., applications in the STPs, and roamer servers) can be embodied in a computing system (e.g., servers) in the networks. While the description above is in the general context of computer-executable instructions that may run on one or more computers, those skilled in the art will recognize that a novel embodiment also can be implemented in combination with other program modules and/or as a combination of hardware and software. Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

A computer typically includes a variety of computer-readable media. Computer-readable media can be any available media that can be accessed by the computer and includes volatile and non-volatile media, removable and non-removable media. By way of example, and not limitation, computer-readable media can comprise computer storage media and communication media. Computer storage media includes volatile and non-volatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital video disk (DVD) or other optical disk storage, magnetic cassettes, magnetic tape, magnetic disk storage or other magnetic storage devices, or any other medium which can be used to store the desired information and which can be accessed by the computer.

Figure 15:
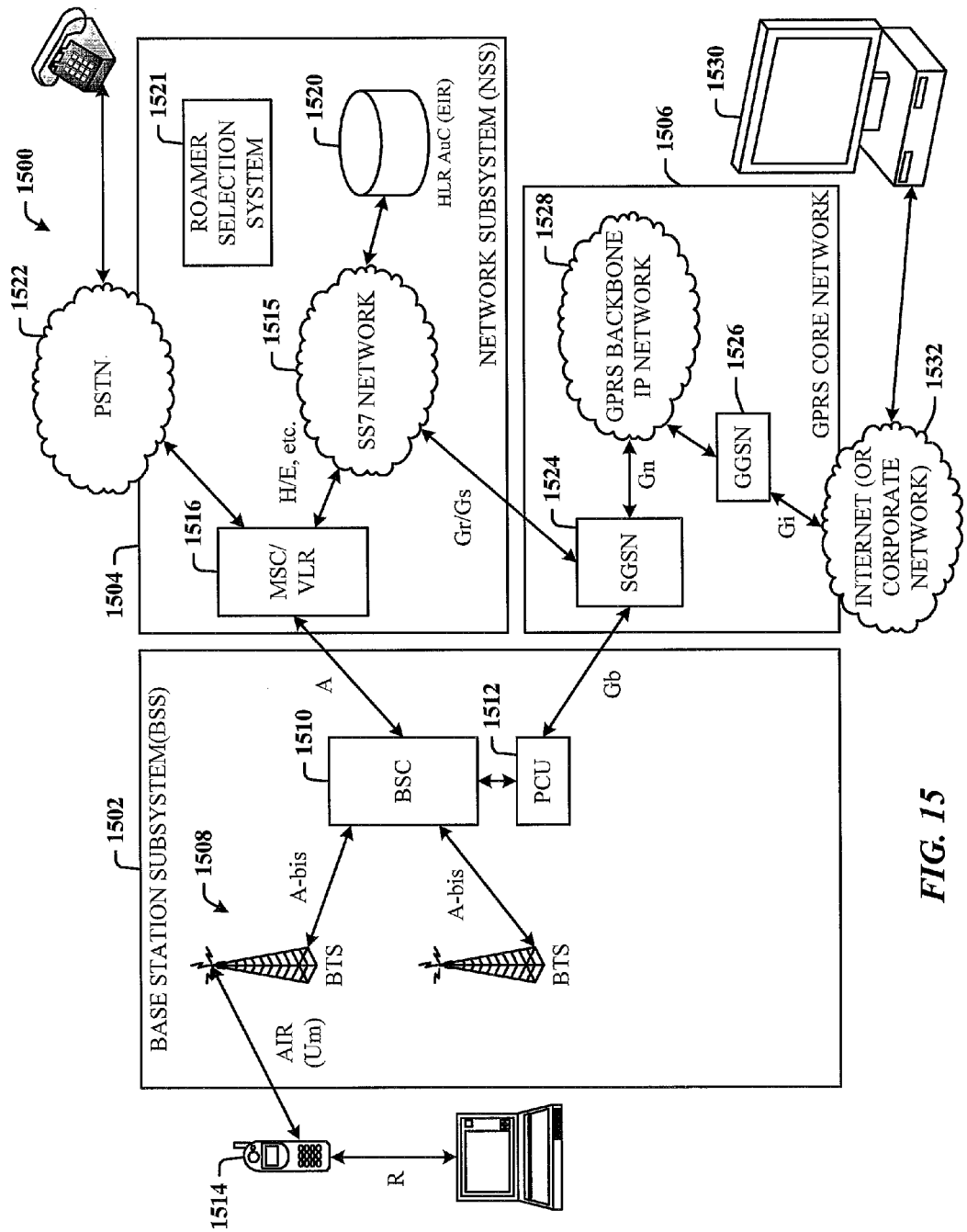
FIG. 15 illustrates an exemplary GSM network that facilitates dynamic roaming management according to an innovative aspect.

FIG. 15 illustrates an exemplary GSM network 1500 that facilitates dynamic terminal management in a roaming environment according to an innovative aspect. The GSM system, designed as a 2G cellular communications system, utilizes TDMA technology to enable greater call capacity. Digitally-encoded speech can also be ciphered to retain call privacy. Voice calls are the primary function of the GSM system. To achieve this, the speech is digitally encoded, and later decoded using a vocoder.

GSM also supports a variety of other data services, although the performance for such data services (e.g., facsimile videotext and teletext) is slow. One data service includes SMS that allows bi-directional messaging, store-and-forward delivery, and alphanumeric messages. The overall system definition for GSM describes not only the air interface, but also the network. GSM uses 200 KHz RF channels, and are typically multiplexed to, for example, enable eight users to access each carrier.

The GSM network 1500 includes a base station subsystem (BSS) 1502, a network subsystem (NSS) 1504 and a GPRS core network 1506. The BSS 1502 can include one or more base transceiver stations (BTS) 1508 and a base station controller (BSC) 1510 connected together on an A-bis interface. The BTS and accompanying base stations (not shown) connect a cell phone to a cellular network. Base stations are all interconnected to facilitate roaming from one cell to another via a process called handover, without losing the cell connection.

A packet control unit (PCU) 1512 is shown connected to the BTS 1510 although the exact position of this can depend on the vendor architecture. The BSS 1502 is connected by the air interface Um to a mobile terminal 1514. The BTS 1508 are the actual transmitters and receivers of radio signals. Typically, a BTS for anything other than a picocell will have several different transceivers (TRXs) which allow it to serve several different frequencies or even several different cells (in the case of sectorized base stations).

By using directional antennae on a base station, each pointing in different directions, it is possible to sectorize the base station so that several different cells are served from the same location. This increases the traffic capacity of the base station (each frequency can carry eight voice channels) while not greatly increasing the interference caused to neighboring cells (in any given direction, only a small number of frequencies are being broadcast).

The BSC 1510 provides the intelligence behind the BTS 1508. Typically, a BSC can have tens or even hundreds of BTSs 1508 under its control. The BSC 1510 handles allocation of radio channels, receives measurements from the mobile phones, and controls handovers from BTS to BTS (except in the case of an inter-MSC handover in which case control is in part the responsibility of the an MSC). One function of the BSC 1510 is to act as a concentrator such that many different low capacity connections to the BTS 1508 can become reduced to a smaller number of connections towards the MSC. Generally, this means that networks are often structured to have many BSCs 1510 distributed into regions near the BTS 1508 which are then connected to large centralized MSC sites.

The PCU 1512 can perform some of the equivalent tasks of the BSC 1510. The allocation of channels between voice and data can be controlled by the base station, but once a channel is allocated to the PCU 1512, the PCU 1512 takes full control over that channel. The PCU 1512 can be built into the base station, built into the BSC, or even in some architectures, it can be at an SGSN site.

The BSS 1502 connects to the NSS 1504 by an A interface. The NSS 1504 is shown containing an MSC 1516 connected via an SS7 network 1518 to an HLR 1520. The AuC and the EIR, although technically separate functions from the HLR 1520, are shown together since combining them can be performed in the network. The roamer selection system 1521 can be part of the GSM network 1500.

The combination of a cell phone 1514 and a SIM card (not shown) creates a special digital "signature" that includes a subscriber number which is sent from the cell phone 1514 to the nearest BTS 1508 asking that the subscriber of a particular network be allowed to use the network. The request is passed on along the network of BTS 1508 to the heart of a cellular network, the MSC 1516. The MSC also routes all incoming and outgoing calls to and from the fixed-line networks or other cellular networks. When the user wants to make an outgoing call, another section of the MSC called the VLR checks whether the caller is actually allowed to make that call. For example, if the caller is barred for international dialing, a message to that effect will be generated by the VLR, sent along the network, and almost instantly back to the cell phone.

The NSS 1504 also contains the component called HLR 1520 that provides the administrative information required to authenticate, register and locate the caller as that network's subscriber. Once the HLR 1520 has received a log-on request, the HLR 1520 immediately checks the special "signature" contained in the request against the HLR special subscriber database. If the subscription is current, the MSC 1516 sends a message back to the phone via the network of BTS 1508 that indicates the caller is allowed to access the network. The name or code of that network will appear on the LCD screen of the cell phone 1514. Once this network "name" message appears on the phone LCD screen, it means the caller is connected to the network and able to make and receive calls.

The HLR 1520 registers which MSC the cell phone is currently connected to, so that when the network MSC 1516 needs to route an incoming call to the cell phone number, it will first check the HLR 1520 to see which MSC is currently serving the cell phone. Periodically, the cell phone will send a message to the MSC indicating where it is, in a process called polling. The combination of the tracking function and the caller's unique digital signature allows the MSC 1516 to route that call to the precise base station the cell phone happens to be connected to, and then exclusively to the cell phone, even if a number of other subscribers are simultaneously connected to that base station.

When traveling to another MSC coverage are while driving, for example, the HLR 1520 is automatically updated, and continues to monitor where exactly it should route the calls should the caller then move within range of another base station. This routing procedure means that out of hundreds of thousands of subscribers, only the correct cell phone will ring when necessary.

The NSS 1504 has a direct connection to the PSTN 1522 from the MSC 1516. There is also a connection to from the NSS 1504 to the GPRS core network 1506 via a Gr/Gs interface although this is optional and not always implemented. The illustrated GPRS Core Network 1506 is simplified to include a SGSN 1524 (connected to the BSS 1502 by the Gb interface) and a GGSN 1526. The SGSN 1524 and the GGSN 1526 are connected together by a private IP network 1528 called a GPRS backbone shown as the Gn reference point. A computer 1530 is depicted as connecting to the core network 1506 via an Internet or corporate network 1532.

Some voice mail systems are linked to a network SMS Center (SMSC), a special facility that handles short messages. The SMSC generates the special SMS message that notifies the caller when they have mail waiting in a Mailbox. SMS messages can be received on an SMS-capable cell phone even while the caller is on a voice call. This is because the SMS messages are sent on a different radio frequency, the GSM data channel, than voice calls, so that the two never interfere.

The law does not require and it is economically prohibitive to illustrate and teach every possible embodiment of the present claims. Hence, the above-described embodiments are merely exemplary illustrations of implementations set forth for a clear understanding of the principles of the invention. Variations, modifications, and combinations may be made to the above-described embodiments without departing from the scope of the claims. All such variations, modifications, and combinations are included herein by the scope of this disclosure and the following claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A method, for managing access to wireless services for a mobile terminal, comprising:
   retrieving, by a tangible component comprising a processor and being part of a wireless communications network, from the mobile terminal, pre-modified access information associated with the mobile terminal;
   generating, by the tangible component, proximity-based access information according to a proximity algorithm, wherein:
      generating the proximity-based access information comprises modifying the pre-modified access information according to the proximity algorithm;
      the proximity algorithm comprises a plurality of percentage goals;
      each of the plurality of percentage goals is associated with a respective foreign network of a plurality of foreign networks;
      each of the plurality of percentage goals represents a target percentage of wireless terminals registered to the respective foreign network;
      a sum of the plurality of percentages is always one-hundred percent; and
      the proximity algorithm causes the tangible component to:
         determine, in connection with each foreign network, of the plurality of foreign networks, an actual-verses-goal percentage difference being a difference in percentage between an actual present percentage of wireless terminals registered presently to the foreign network and the percentage goals is associated with the foreign network; and
         collate a list of the foreign networks based on a proximity of the actual present percentage for each foreign network to the percentage goal for the foreign network so that a foreign network, of the plurality of foreign networks, associated with a higher actual-verses-goal percentage difference is collated to a first end of the list and a foreign network, of the plurality of foreign networks, associated with a lower actual-verses-goal percentage difference is collated to a second end of the list; and
   sending, by the tangible component, the proximity-based access information to the mobile terminal to remotely manage registration of the mobile terminal to one of the plurality of foreign networks based upon the proximity-based access information.

2. The method of claim 1, further comprising setting the plurality of percentage goals based at least in part on a profitability for a home carrier for the mobile terminal.

3. The method of claim 1, further comprising setting the plurality of percentage goals based at least in part on a coverage parameter.

4. The method of claim 1, further comprising setting the plurality of percentage goals based at least in part on service segmentation.

5. The method of claim 1, wherein generating, by the tangible component, the proximity-based access information according to the proximity algorithm comprises comparing, by the tangible component, a plurality of actual present percentages, each actual present percentage representing a percentage of wireless terminals registered presently to one of the respective foreign networks, to the plurality of percentage goals for the respective foreign networks.

6. The method of claim 5, further comprising determining, by the tangible component, which, if any, of the plurality of actual present percentages is farthest from the percentage goal for the respective foreign network.

7. The method of claim 1, wherein if, in collating the list of the foreign networks, it is determined that any two of the foreign networks are associated with equal actual-verses-goal percentage differences, the proximity algorithm causes the tangible component to collate the two foreign networks in the list according to a pre-defined apportioning preference.

8. The method of claim 1, wherein:
   the list collated is a presently-collated list of the foreign networks;
   the method further comprises:
      obtaining, by the tangible component, a previously-collated list of the foreign networks;
      comparing, by the tangible component, in a comparison, the presently-collated list of the foreign networks to a previously-collated list of the foreign networks;
      determining, by the tangible component, in a determination, based on the comparison, whether the presently-collated list differs by at least a determined level from the previously-collated list of the foreign networks;
   sending, by the tangible component, the proximity-based access information to the mobile terminal is performed in response to determining, in the determination, that the presently-collated list differs by at least the determined level from the previously-collated list.

9. The method of claim 8, wherein the proximity-based access information is not sent to the mobile terminal if it is determined, in the determination, that the presently-collated list does not differs by at least the determined level from the previously-collated list.

10. A computer-readable storage device, for use in a wireless network, comprising computer-executable instructions that, when executed by a processor, cause the processor to perform operations, for managing access to wireless services for a mobile terminal, comprising:
  retrieving, from the mobile terminal, pre-modified access information associated with the mobile terminal;
  generating proximity-based access information according to a proximity algorithm, wherein:
    generating the proximity-based access information comprises modifying the pre-modified access information according to the proximity algorithm;
    the proximity algorithm comprises a plurality of percentage goals;
    each of the plurality of percentage goals is associated with a respective foreign network of a plurality of foreign networks;
    each of the plurality of percentage goals represents a target percentage of wireless terminals registered to the respective foreign network;
    a sum of the plurality of percentages is always one-hundred percent; and
    the proximity algorithm causes the processor to:
      determine, in connection with each foreign network, of the plurality of foreign networks, an actual-verses-goal percentage difference being a difference in percentage between an actual present percentage of wireless terminals registered presently to the foreign network and the percentage goals is associated with the foreign network; and
      collate a list of the foreign networks based on a proximity of the actual present percentage for each foreign network to the percentage goal for the foreign network so that a foreign network, of the plurality of foreign networks, associated with a higher actual-verses-goal percentage difference is collated to a first end of the list and a foreign network, of the plurality of foreign networks, associated with a lower actual-verses-goal percentage difference is collated to a second end of the list; and
  sending the proximity-based access information to the mobile terminal to remotely manage registration of the mobile terminal to one of the plurality of foreign networks based upon the proximity-based access information.

11. The computer-readable storage device of claim 10, wherein the operations further comprise setting the plurality of percentage goals based on at least one parameter selected from a list consisting of:
  a profitability for a home carrier for the mobile terminal;
  a coverage parameter; and
  service segmentation.

12. The computer-readable storage device of claim 10, wherein the operation of generating the proximity-based access information comprises comparing a plurality of actual present percentages, each representing a percentage of wireless terminals registered presently to one of the respective foreign networks, to the plurality of percentage goals for the respective foreign networks.

13. The computer-readable storage device of claim 10, wherein if, in collating the list of the foreign networks, it is determined that any two of the foreign networks are associated with equal actual-verses-goal percentage differences, the proximity algorithm causes the processor to collate the two foreign networks in the list according to a pre-defined apportioning preference.

14. The computer-readable storage device of claim 10, wherein:
  the list collated is a presently-collated list of the foreign networks;
  the operations further comprise:
    obtaining a previously-collated list of the foreign networks;
    comparing in a comparison, the presently-collated list of the foreign networks to a previously-collated list of the foreign networks;
    determining in a determination, based on the comparison, whether the presently-collated list differs by at least a determined level from the previously-collated list of the foreign networks;
  the operation of sending the proximity-based access information to the mobile terminal is performed in response to determining, in the determination, that the presently-collated list differs by at least the determined level from the previously-collated list.

15. The computer-readable storage device of claim 14, wherein the operation of sending the proximity-based access information to the mobile terminal is not performed if it is determined, in the determination, that the presently-collated list does not differs by at least the determined level from the previously-collated list.

16. A wireless communications system comprising:
  a processor; and
  a tangible computer-readable medium comprising computer-executable instructions that, when executed by the processor, cause the processor to perform operations, for managing access to wireless services for a mobile terminal, comprising:
    retrieving, from the mobile terminal, pre-modified access information associated with the mobile terminal;
    generating proximity-based access information according to a proximity algorithm, wherein:
      generating the proximity-based access information comprises modifying the pre-modified access information according to the proximity algorithm;
      the proximity algorithm comprises a plurality of percentage goals:
      each of the plurality of percentage goals is associated with a respective foreign network of a plurality of foreign networks;
      each of the plurality of percentage goals represents a target percentage of wireless terminals registered to the respective foreign network;
      a sum of the plurality of percentages is always one-hundred percent; and
      the proximity algorithm causes the processor to:
        determine, in connection with each foreign network, of the plurality of foreign networks, an actual-verses-goal percentage difference being a difference in percentage between an actual present percentage of wireless terminals registered presently to the foreign network and the percentage goals is associated with the foreign network; and
        collate a list of the foreign networks based on a proximity of the actual present percentage for each foreign network to the percentage goal for the foreign network so that a foreign network, of the plurality of foreign networks, associated with a higher actual-verses-goal percentage difference is collated to a first end of the list and a foreign network, of the plurality of foreign networks, associated with a lower actual-verses-goal percentage difference is collated to a second end of the list; and sending the proximity-based access information to the mobile terminal to remotely manage registration of the mobile terminal to one of the plurality of foreign networks based upon the proximity-based access information.

17. The wireless communications system of claim 16, wherein the operation of generating the proximity-based access information comprises comparing a plurality of actual present percentages, each representing a percentage of wireless terminals registered presently to one of the respective foreign networks, to the plurality of percentage goals for the respective foreign networks.

18. The wireless communications system of claim 16, wherein if, in collating the list of the foreign networks, it is determined that any two of the foreign networks are associated with equal actual-verses-goal percentage differences, the proximity algorithm causes the processor to collate the two foreign networks in the list according to a pre-defined apportioning preference.

19. The wireless communications system of claim 16, wherein:

the list collated is a presently-collated list of the foreign networks;

the operations further comprise:

obtaining a previously-collated list of the foreign networks;

comparing in a comparison, the presently-collated list of the foreign networks to a previously-collated list of the foreign networks;

determining in a determination, based on the comparison, whether the presently-collated list differs by at least a determined level from the previously-collated list of the foreign networks;

the operation of sending the proximity-based access information to the mobile terminal is performed in response to determining, in the determination, that the presently-collated list differs by at least the determined level from the previously-collated list.

20. The wireless communications system of claim 19, wherein the operation of sending the proximity-based access information to the mobile terminal is not performed if it is determined, in the determination, that the presently-collated list does not differs by at least the determined level from the previously-collated list.

* * * * *